(12) United States Patent
Peng et al.

(10) Patent No.: US 12,538,368 B2
(45) Date of Patent: Jan. 27, 2026

(54) UNMANNED AERIAL VEHICLE AND PAIRING METHOD AND SYSTEM THEREOF

(71) Applicant: AUTEL ROBOTICS CO., LTD., Shenzhen (CN)

(72) Inventors: Guolong Peng, Guangdong (CN); Zhuhong Gao, Guangdong (CN); Wenping Fang, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 290 days.

(21) Appl. No.: 18/492,004

(22) Filed: Oct. 23, 2023

(65) Prior Publication Data

US 2024/0138000 A1 Apr. 25, 2024
US 2024/0237095 A9 Jul. 11, 2024

(30) Foreign Application Priority Data

Oct. 21, 2022 (CN) .......................... 202211295586.X

(51) Int. Cl.
*H04W 76/14* (2018.01)
*B64U 10/13* (2023.01)
*B64U 101/30* (2023.01)

(52) U.S. Cl.
CPC ............ *H04W 76/14* (2018.02); *B64U 10/13* (2023.01); *B64U 2101/30* (2023.01); *B64U 2201/20* (2023.01)

(58) Field of Classification Search
CPC ...... H04W 76/14; H04W 76/19; B64U 10/13; B64U 2101/30; B64U 2201/20; H04M 1/72412; H04M 1/6066
See application file for complete search history.

(56) References Cited

U.S. PATENT DOCUMENTS

2017/0269590 A1* 9/2017 Feng ................... G05D 1/0022
2019/0281479 A1* 9/2019 Althoff ................. H04W 24/08
(Continued)

FOREIGN PATENT DOCUMENTS

CN 108616485 A 10/2018
CN 112119648 A 12/2020
(Continued)

OTHER PUBLICATIONS

The first office action of the CN priority application issued on May 10, 2025.
(Continued)

*Primary Examiner* — Cindy Trandai

(57) ABSTRACT

An embodiment of the present application relate to the technical field of an unmanned aerial vehicle, in particular to an unmanned aerial vehicle and a pairing method and system thereof. The method includes establishing a master pairing relationship between a master controller and an unmanned aerial vehicle via pairing information transmitted by the master controller; receiving a slave pairing request forwarded by the master controller, generating temporary pairing information, and transmitting the temporary pairing information to the master controller, and transmitting the slave pairing request to the master controller; acquiring the temporary pairing information transmitted by the slave controller after the master controller transmits the temporary pairing information to the slave controller, and establishing a slave pairing relationship between the slave controller and the unmanned aerial vehicle according to the temporary pairing information transmitted by the slave controller.

20 Claims, 12 Drawing Sheets

(56) References Cited

U.S. PATENT DOCUMENTS

| 2020/0196110 A1* | 6/2020 | Jakobsson | H04W 76/14 |
| 2020/0264604 A1* | 8/2020 | Tao | G05D 1/0022 |
| 2020/0288522 A1* | 9/2020 | Ma | H04W 4/40 |
| 2020/0322788 A1* | 10/2020 | Batra | H04W 8/24 |
| 2020/0382569 A1* | 12/2020 | Fornshell | H04M 1/6066 |
| 2021/0153153 A1* | 5/2021 | Yang | H04W 76/40 |

FOREIGN PATENT DOCUMENTS

| CN | 114637314 A | 6/2022 |
| WO | WO2020143677 A1 | 7/2020 |

OTHER PUBLICATIONS

EN Translation of The first office action of the CN priority application—by machine.

\* cited by examiner

S301

S3011 — Receive the pairing information transmitted by the first application after the first application receives the pairing information transmitted by the master controller, wherein the first application is communicatively coupled with the unmanned aerial vehicle by scanning a two-dimensional code corresponding to the unmanned aerial vehicle

S3021 — Control the unmanned aerial vehicle to enter a first search and decoding state after receiving the pairing information transmitted by the first application, wherein the first search and decoding state is used for acquiring the pairing information about the master controller and for transmitting the pairing information about the unmanned aerial vehicle to the first application S3022 — Establish a master pairing relationship between the master controller and the unmanned aerial vehicle after the unmanned aerial vehicle acquires the pairing information about the master controller and the master controller acquires the pairing information about the unmanned aerial vehicle, wherein the pairing information about the master controller includes the key information about the master controller and the pairing information about the unmanned aerial vehicle includes the key information about the unmanned aerial vehicle

```
Combine the key information about the
unmanned aerial vehicle, the key information
about the master controller, and a temporary code    S3031
to generate the temporary pairing information
after receiving the slave pairing request
forwarded by the master controller
```

```
Acquire the temporary pairing information
transmitted by the second application corresponding
to the slave controller after the first application    S3041
corresponding to the master controller transmits the
temporary pairing information to the second
application corresponding to the slave controller
```

FIG. 7

UNMANNED AERIAL VEHICLE AND PAIRING METHOD AND SYSTEM THEREOF

CROSS-REFERENCE TO RELATED APPLICATION

This application claims the benefit of and priority to Chinese patent Application No. 202211295586.X, filed Oct. 21, 2022, the entirety of which is hereby incorporated herein by reference.

BACKGROUND

With the continuous development of unmanned aerial vehicle aerial photography technology, unmanned aerial vehicles have gradually become popular, widely used in aerial photography, city management, surveying and mapping, power inspection, agriculture, weather, and other fields, and then derived from consumption unmanned aerial vehicles and industrial unmanned aerial vehicles and other product forms. Regardless of the type of unmanned aerial vehicles, if an unmanned aerial vehicle is controlled by a remote control, there must be pairing first to form a one-to-one or one-to-many binding relationship.

At present, a communication channel is adjusted to the pairing channel through the specific keys on the remote controller and the unmanned aerial vehicle, so that the remote controller and the unmanned aerial vehicle enter the pairing state; after the information exchange confirmation is performed between the remote controller and the unmanned aerial vehicle, the pairing is completed and the normal communication state is entered; however, this pairing mode is usually performed on a relatively fixed channel, and there is a problem of mis-pairing when a plurality of sets of unmanned aerial vehicles are paired simultaneously.

SUMMARY

The present invention relates to the field of unmanned aerial vehicles, in particular to an unmanned aerial vehicle and a pairing method and system thereof An embodiment of the present application provides an unmanned aerial vehicle and a pairing method and system thereof to solve the problem of easy pairing errors when a plurality of sets of unmanned aerial vehicles are paired at the same time, and improve the stability of unmanned aerial vehicle pairing.

In order to solve the above technical problem, an embodiment of the present application provides the following technical solutions:

in a first aspect, an embodiment of the present application provides a pairing method for an unmanned aerial vehicle, wherein the method is applied to the unmanned aerial vehicle and includes:

acquiring pairing information transmitted by a master controller after the unmanned aerial vehicle is communicatively coupled to the master controller;

establishing a master pairing relationship between the master controller and the unmanned aerial vehicle according to the pairing information transmitted by the master controller;

receiving a slave pairing request forwarded by the master controller, generating temporary pairing information, and transmitting the temporary pairing information to the master controller, wherein the slave pairing request is transmitted by a slave controller to the master controller;

acquiring the temporary pairing information transmitted by the slave controller after the master controller transmits the temporary pairing information to the slave controller, wherein the temporary pairing information transmitted by the slave controller is obtained by the slave controller combining key information about the unmanned aerial vehicle and key information about the slave controller; and establishing a slave pairing relationship between the slave controller and the unmanned aerial vehicle according to the temporary pairing information transmitted by the slave controller.

In a second aspect, a pairing method for an unmanned aerial vehicle, wherein the method is applied to a pairing system of an unmanned aerial vehicle, and the pairing system of the unmanned aerial vehicle includes an unmanned aerial vehicle, a master controller and a slave controller, and the method includes:

acquiring pairing information transmitted by the master controller after the unmanned aerial vehicle is communicatively coupled to the master controller;

establishing, by the unmanned aerial vehicle, a master pairing relationship between the master controller and the unmanned aerial vehicle according to the pairing information transmitted by the master controller;

receiving, by the master controller, a slave pairing request transmitted by the slave controller and forwarding the slave pairing request to the unmanned aerial vehicle;

generating, by the master controller, temporary pairing information after the unmanned aerial vehicle receives the slave pairing request forwarded, and transmitting the temporary pairing information to the master controller; and acquiring, by the unmanned aerial vehicle, the temporary pairing information transmitted by the slave controller, wherein the temporary pairing information transmitted by the slave controller is obtained by the slave controller combining the key information about the unmanned aerial vehicle and the key information about the slave controller, and establishing a slave pairing relationship between the slave controller and the unmanned aerial vehicle according to the temporary pairing information transmitted by the slave controller.

In a third aspect, an embodiment of the present application provides a pairing method for an unmanned aerial vehicle, wherein the method is applied to a pairing system of an unmanned aerial vehicle, and the pairing system of the unmanned aerial vehicle includes an unmanned aerial vehicle, a master controller, a slave controller, a first mobile terminal and a second mobile terminal, and the method includes:

acquiring, by the first mobile terminal, pairing information about the master controller and pairing information about the unmanned aerial vehicle, and transmitting the pairing information about the unmanned aerial vehicle to the master controller;

establishing a master pairing relationship between the master controller and the unmanned aerial vehicle after the unmanned aerial vehicle acquires pairing information about the master controller and the master controller acquires pairing information about the unmanned aerial vehicle;

receiving, by the master controller, a slave pairing request transmitted by the slave controller, and forwarding the slave pairing request to the unmanned aerial vehicle;

generating, by the master controller, temporary pairing information after the unmanned aerial vehicle receives the slave pairing request forwarded, and transmitting the temporary pairing information to the master controller; and transmitting, by the master controller, the temporary pairing information to the first mobile terminal, so that the first mobile terminal transmits the temporary pairing information to the second mobile terminal;

acquiring, by the second mobile terminal, temporary pairing information transmitted by the first mobile terminal, and acquiring pairing information about the slave controller;

transmitting, by the slave controller, temporary pairing information to the unmanned aerial vehicle, wherein the transmission of the temporary pairing information to the unmanned aerial vehicle by the slave controller is obtained by the slave controller combining the key information about the unmanned aerial vehicle and the key information about the slave controller; and establishing, by the unmanned aerial vehicle, a slave pairing relationship between the slave controller and the unmanned aerial vehicle according to the temporary pairing information transmitted by the slave controller.

In a fourth aspect, an embodiment of the present application provides an unmanned aerial vehicle comprising:

at least one processor; and a memory communicatively coupled to the at least one processor; wherein the memory stores instructions executable by the at least one processor to enable the at least one processor to perform a pairing method for an unmanned aerial vehicle according to the first aspect.

In a fifth aspect, a pairing system of an unmanned aerial vehicle, wherein the pairing method for the unmanned aerial vehicle according to the second aspect is applied, and the system includes:

an unmanned aerial vehicle;

a master controller communicatively coupled to the unmanned aerial vehicle; and a slave controller communicatively coupled to the unmanned aerial vehicle.

In a sixth aspect, a pairing system of an unmanned aerial vehicle, wherein the pairing method for the unmanned aerial vehicle according to the third aspect is applied, and the system includes:

an unmanned aerial vehicle;

a master controller communicatively coupled to the unmanned aerial vehicle;

a slave controller communicatively coupled to the unmanned aerial vehicle;

a first mobile terminal communicatively coupled to the master controller; and a second mobile terminal communicatively coupled to the slave controller.

In a seventh aspect, an embodiment of the present application provides a computer-readable storage medium for storing a computer program that causes a computer to execute instructions of some or all the steps as described in the first, second or third aspects.

In an eighth aspect, an embodiment of the present application provides a computer program product, wherein the computer program product includes a non-transitory computer-readable storage medium having a computer program stored thereon, the computer program being operable to cause a computer to perform some or all the steps as described in the first, second or third aspects. The computer program product may be a software installation package.

BRIEF DESCRIPTION OF THE DRAWINGS

One or more embodiments are illustrated by way of example and not by way of limitation in the figures of the accompanying drawings, in which elements having the same reference numeral designations represent similar elements, and in which the figures are not to scale unless otherwise specified.

FIG. 4 is a detailed flow chart of step S301 in FIG. 3.
FIG. 5 is a detailed flow chart of step S302 in FIG. 3.
FIG. 6 is a detailed flow chart of step S303 in FIG. 3.
FIG. 7 is a detailed flow chart of step S304 in FIG. 3.

DETAILED DESCRIPTION

Figure 1:
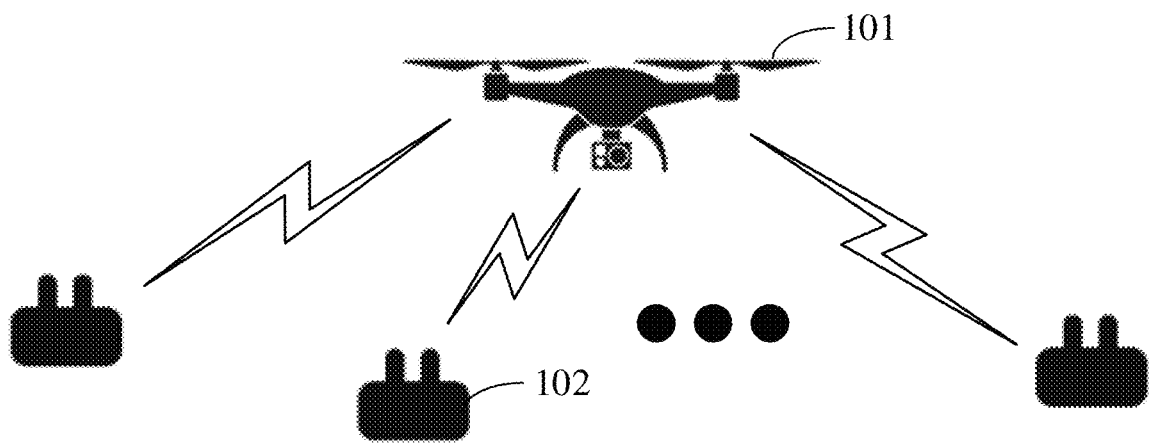
FIG. 1 is a schematic diagram showing an application scenario according to an embodiment of the present application

To facilitate an understanding of the present application, a more particular description of the application will be rendered by reference to specific embodiments thereof which are illustrated in the appended drawings. It will be understood that when an element is referred to as being "secured" to another element, it can be directly on another element or there may be one or more intervening elements in between. When an element is referred to as being "coupled" to another element, it can be directly coupled to another element or there may be one or more intervening elements in between. As used in the description, the terms "upper", "lower", "inner", "outer", "bottom", and the like indicate orientations or positional relationships based on the orientation or positional relationships shown in the drawings, are merely for convenience in describing and simplifying the present application, and do not indicate or imply that the referenced apparatuses or elements must have a particular orientation, be constructed and operated in a particular orientation, and thus are not to be construed as limiting the present application. Further, the terms "first", "second", "third", and the like are used for descriptive purposes only and are not to be construed as indicating or implying relative importance.

Unless defined otherwise, all technical and scientific terms used in the description have the same meaning as commonly understood by a person skilled in the art to which the present application belongs. The terminology used in the description of the present application herein is for the purpose of describing embodiments only and is not intended to be limiting of the present application. As used herein, the term "and/or" includes any and all combinations of one or more of the associated listed items.

Furthermore, the technical features involved in the different an embodiment of the present application described below can be combined with each other if they do not conflict with each other.

An application environment of the pairing method for the unmanned aerial vehicle in the embodiment of the present application is exemplified below.

Referring to FIG. 1, FIG. 1 is a schematic diagram showing an application scenario provided by an embodiment of the present application.

As shown in FIG. 1, the application scenario includes an unmanned aerial vehicle 101, a plurality of controllers 102, wherein the unmanned aerial vehicle 101 is communicatively coupled to each controller 102, for example: the unmanned aerial vehicle 101 is communicatively coupled to each controller 102 through a wireless network, and an unmanned aerial vehicle pilot or user operable controller 102 operates the unmanned aerial vehicle 101 through the wireless network.

In some embodiments, the unmanned aerial vehicle 101 includes: unmanned aerial vehicles such as a multi-rotor unmanned aerial vehicle, a fixed-wing unmanned aerial vehicle, an unmanned helicopter and a hybrid-wing unmanned aerial vehicle. In some embodiments, the unmanned aerial vehicle 101 may also be an unmanned flight vehicle driven by any type of power, including, but not limited to, a rotor-wing unmanned aerial vehicle, a fixed-wing unmanned aerial vehicle, a parasol-wing unmanned aerial vehicle, a flapping-wing unmanned aerial vehicle, a helicopter model, and the like. In an embodiment of the present application, a hybrid-wing unmanned aerial vehicle is set forth as an example.

Further, the unmanned aerial vehicle 101 may be provided with a corresponding volume or power according to the needs of actual situations to provide a load capacity, a flight speed, a flight mileage, and the like that can meet the use needs. One or more sensors may also be added to the unmanned aerial vehicle 101 to enable the unmanned aerial vehicle 101 to acquire corresponding data.

For example, in some embodiments, the unmanned aerial vehicle 101 is provided with at least one of an accelerometer, a gyroscope, a magnetometer, a GPS navigator, and a vision sensor.

The unmanned aerial vehicle 101 further includes a flight controller, serving as a control core of unmanned aerial vehicle flight and data transmission, and integrating one or more modules to execute corresponding logic control programs.

In an embodiment of the present application, the unmanned aerial vehicle includes an unmanned aerial vehicle control system, and the unmanned aerial vehicle control system includes a state machine, a flight controller, an unmanned aerial vehicle power system and an unmanned aerial vehicle sensor, and the like Specifically, the unmanned aerial vehicle control system includes: a state machine, a flight controller and an unmanned aerial vehicle dynamic system; specifically, the state machine is connected to the flight controller and the unmanned aerial vehicle dynamic system; input of the state machine is navigation data and a user interaction command, and output thereof is a control command and a corresponding flag bit; and the main function of the state machine is to process the user interaction command and use the navigation data to realize various functions of the unmanned aerial vehicle, such as upper-layer functions of flight mode switching, state monitoring, flight to flight destinations and returned voyage. The user interaction command is an interaction command issued by a terrestrial user, for example: the present application can be implemented in a state machine by remotely controlling commands such as lever amount data and key control commands. Specifically, the control commands and corresponding flag bits output by the state machine are a position command, a speed command, an acceleration command, an altitude command, a climb rate command, a climb acceleration command, an attitude angle command, a heading angle rate command, an attitude mode flag bit, and a position mode flag bit.

Specifically, a flight controller is connected to a state machine and a flight controller, and is used for receiving a control command and a corresponding flag bit transmitted by the state machine, receiving navigation data transmitted by an unmanned aerial vehicle power system, and outputting a motor speed control command, wherein the flight controller includes two flight modes, i.e., a position mode and an attitude mode, and the main function of the flight controller is to use the control command and the navigation data to calculate the motor speed command through a certain algorithm to enable the unmanned aerial vehicle to realize position and attitude control, i.e., enabling the position and attitude of the unmanned aerial vehicle to reach a desired state. Specifically, the battery speed control command, for example a conventional rotorcraft, controls a Pulse Width Modulation (PWM) of the motor.

Specifically, an unmanned aerial vehicle power system is connected to a flight controller, and the unmanned aerial vehicle power system includes an execution system and a state monitoring system of the unmanned aerial vehicle, and is used for receiving a motor rotation speed control command transmitted by the flight controller, achieving a corresponding rotation speed, thereby achieving a corresponding attitude angle and position, processing sensor data, and indirectly or directly calculating navigation data. Specifically, the unmanned aerial vehicle (UAV) dynamic system uses fusion algorithm to process the UAV sensor data to obtain the navigation data. For example, the unmanned aerial vehicle power system includes a GPS, a gyroscope, an accelerometer and a magnetometer, and the position, velocity and acceleration data of the unmanned aerial vehicle can be solved by the GPS, the gyroscope, the accelerometer, and the magnetometer. The position, velocity and acceleration of UAV can be calculated by binocular vision, gyroscope, accelerometer, and magnetometer. The attitude angle and attitude rate of UAV can be calculated by a gyroscope, an accelerometer, and a magnetometer.

In some embodiments, the controller 102 includes an intelligent terminal, wherein the intelligent terminal may be any type of intelligent apparatus used to establish a communication coupling with the unmanned aerial vehicle 101, such as a mobile terminal such as a cell phone, tablet computer, or intelligent remote control. The controller 102 may be equipped with one or more different user interaction apparatuses to collect user instructions or to present and feedback information to the user. Alternatively, the controller 102 includes a terminal device, wherein the terminal device includes a computer device, a PC-terminal or the like that establishes a communication coupling with the unmanned aerial vehicle 101, and the terminal device may be equipped with one or more different user interaction apparatus for collecting user instructions or presenting and feeding back information to the user.

The above-mentioned user interaction apparatuses include but are not limited to: keys, mice, keyboards, displays, touch screens, speakers, and remote levers. For example, the controller 102 may be equipped with a touch control display screen, receiving a remote control instruction from a user to the unmanned aerial vehicle 101 via the touch control display screen, and displaying map information, i.e., an image transmission picture, to the user via the touch control display screen, and displaying image information obtained by aerial photography, i.e., a picture transmission picture, to the user; the user may also switch the image information currently displayed on the display screen via a remote control touch screen; and the user may also control the movement of the unmanned aerial vehicle via the operation of a mouse or the key operation of a keyboard, or control the direction of a pan-tilt of the unmanned aerial vehicle, a focal length of a pan-tilt camera of the unmanned aerial vehicle, and the like.

In some embodiments, existing image vision processing techniques may be integrated between the unmanned aerial vehicle 101 and the controller 102 to further provide more intelligent services. For example: the unmanned aerial vehicle 101 can acquire an image by means of a dual-light camera, and the controller 102 parses the image to realize the gesture control of the user on the unmanned aerial vehicle 101.

In some embodiments, the wireless network may be a wireless communication network based on any type of data transmission principle for establishing a data transmission channel between two nodes, such as a Bluetooth network, a WiFi network, a wireless cellular network, or a combination thereof located in different signal bands.

Figure 2:
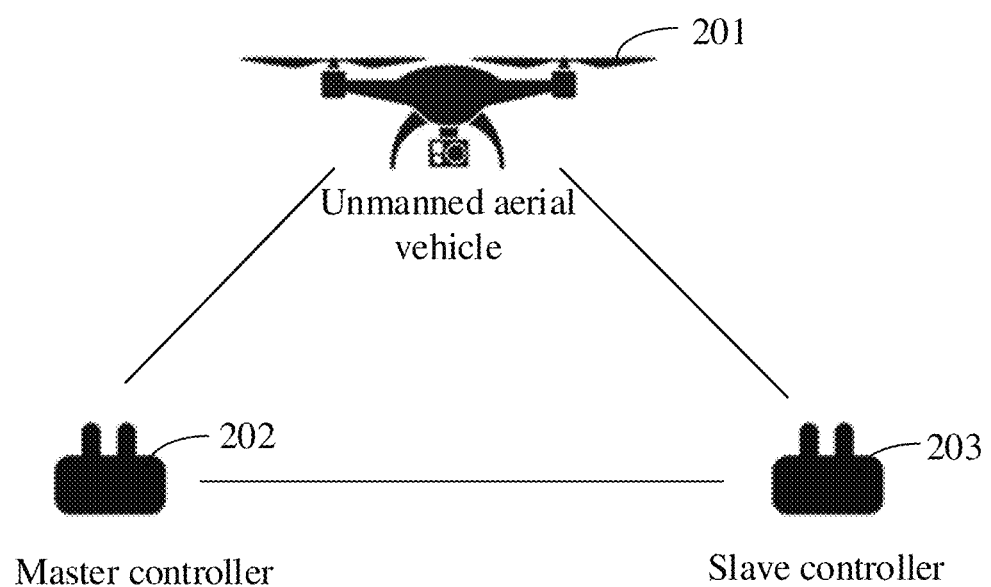
FIG. 2 is a schematic diagram showing an application scenario according to Embodiment 1 of the present application.

The technical solutions of the present application are described below referring to the drawings accompanying the description:

Referring to FIG. 2, FIG. 2 is a schematic diagram showing an application scenario provided by an embodiment of the present application.

As shown in FIG. 2, the application scenario includes an unmanned aerial vehicle 201, a master controller 202 and a slave controller 203, wherein both the master controller 202 and the slave controller 203 are communicatively coupled to the unmanned aerial vehicle 201, and the master controller 202 and the slave controller 203 are communicatively coupled to each other.

Figure 3:
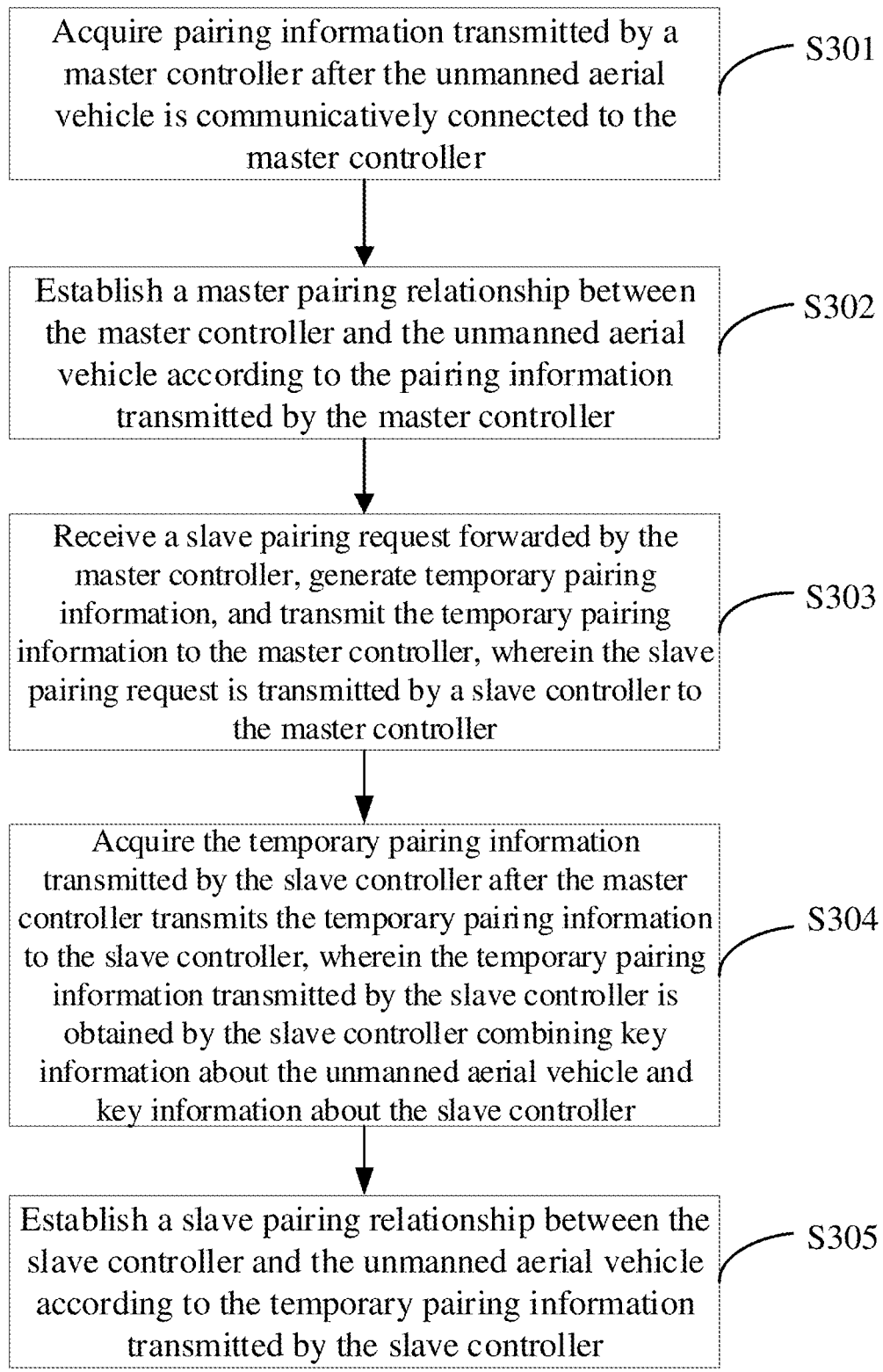
FIG. 3 is a schematic flow diagram showing a pairing method for an unmanned aerial vehicle according to an embodiment of the present application.

Referring to FIG. 3, FIG. 3 is a schematic flow diagram showing a pairing method for an unmanned aerial vehicle according to an embodiment of the present application.

The pairing method for the unmanned aerial vehicle is applied to the unmanned aerial vehicle, and in particular, the execution subject of the pairing method for the unmanned aerial vehicle is one or more processors of the unmanned aerial vehicle.

As shown in FIG. 3, the pairing method for the unmanned aerial vehicle includes:
 step S301: acquire pairing information transmitted by a master controller after the unmanned aerial vehicle is communicatively connected to the master controller.

Specifically, the unmanned aerial vehicle and the master controller are communicatively coupled based on a preset communication protocol, for example: a TCP communication protocol, a UDP communication protocol and a Netty communication protocol, wherein after the unmanned aerial vehicle is communicatively coupled to the master controller, the unmanned aerial vehicle acquires pairing information transmitted by the master controller, the pairing information is a pairing parameter, and the pairing parameter includes a pairing code and an internal parameter of a Modem, wherein the pairing code is used for interfacing with the slave controller, and the internal parameter includes a working transmission rate, an amplitude modulation parameter, a frequency modulation parameter and a phase modulation parameter, and the like.

In an embodiment of the present disclosure, the master controller corresponds to a first application, i.e., a first application is installed on the master controller, and the first application is used for acquiring the pairing information about the master controller and transmitting the pairing information about the master controller to the unmanned aerial vehicle.

Specifically, referring to FIG. 4, and FIG. 4 is a detailed flow chart of step S301 in FIG. 3;

As shown in FIG. 4, the step S301 includes:
 step S3011: receive the pairing information transmitted by the first application after the first application receives the pairing information transmitted by the master controller, wherein the first application is communicatively coupled with the unmanned aerial vehicle by scanning a two-dimensional code corresponding to the unmanned aerial vehicle.

Specifically, the first application is installed to a master controller including, but not limited to, a remote controller, a mobile phone, a tablet computer, a controller or an image device for display, and the like, and the master controller is connected to the unmanned aerial vehicle based on WiFi by scanning a corresponding two-dimensional code of the unmanned aerial vehicle to perform communication coupling with the unmanned aerial vehicle. Wherein after the first application corresponding to the master controller is connected to the unmanned aerial vehicle via the WiFi, the master controller can directly obtain the pairing information about the unmanned aerial vehicle, and the unmanned aerial vehicle can also obtain the pairing information about the master controller.

Step S302: Establish a master pairing relationship between the master controller and the unmanned aerial vehicle according to the pairing information transmitted by the master controller.

Specifically, referring again to FIG. 5, and FIG. 5 is a detailed flow chart of step S302 in FIG. 3.

As shown in FIG. 5, the step S302 includes:
 step S3021: control the unmanned aerial vehicle to enter a first search and decoding state after receiving the pairing information transmitted by the first application, wherein the first search and decoding state is used for acquiring the pairing information about the master controller and for transmitting the pairing information about the unmanned aerial vehicle to the first application.

Specifically, after the unmanned aerial vehicle receives the pairing information about the master controller transmitted by the first application, the pairing parameter of the master controller and the pairing parameter of the unmanned aerial vehicle are triggered to interact to control the unmanned aerial vehicle to enter a first search and decoding state, wherein the first search and decoding state is a frequency scanning process performed on the basis of an LTE protocol; the unmanned aerial vehicle searches for valid data in the pairing information about the master controller by scanning valid frequency points and decodes same to acquire the decoded pairing information; and when the pairing information about the decoded master controller is acquired, the unmanned aerial vehicle transmits pairing information about the unmanned aerial vehicle itself to the first application corresponding to the master controller.

S3022: Establish a master pairing relationship between the master controller and the unmanned aerial vehicle after the unmanned aerial vehicle acquires the pairing information about the master controller and the master controller acquires the pairing information about the unmanned aerial vehicle, wherein the pairing information about the master controller includes the key information about the master controller and the pairing information about the unmanned aerial vehicle includes the key information about the unmanned aerial vehicle.

Specifically, when the unmanned aerial vehicle acquires the pairing information about the master controller after decoding, and after the master controller acquires the pairing information about the unmanned aerial vehicle, at this time, since the unmanned aerial vehicle and the master controller have performed parameter interaction via the WiFi, which device is allowed to access is pre-set at the master controller terminal or the unmanned aerial vehicle end, and at this time, it is only necessary to perform pairing information pairing between the two sides via the interaction information to determine whether it is a device with a pre-set access; and if the pairing information is successfully matched, a master pairing relationship between the master controller and the unmanned aerial vehicle is established, wherein the master controller pairing information includes key information about the master controller, and the pairing information about the unmanned aerial vehicle includes key information about the unmanned aerial vehicle.

Step S303: Receive a slave pairing request forwarded by the master controller, generate temporary pairing information, and transmit the temporary pairing information to the master controller, wherein the slave pairing request is transmitted by a slave controller to the master controller.

Specifically, if a slave controller wants to access the unmanned aerial vehicle, first, the slave controller transmits a slave pairing request to the master controller; after receiving the slave pairing request transmitted by the slave controller, the master controller forwards the slave pairing request transmitted by the slave controller to the unmanned aerial vehicle; and the unmanned aerial vehicle generates temporary pairing information and transmits the temporary pairing information to the master controller.

In an embodiment of the present application, the slave controller corresponds to a second application, i.e., a second application is installed to the slave controller, and the second application is used to acquire pairing information about the slave controller and transmit the pairing information about the slave controller to the unmanned aerial vehicle.

Specifically, referring to FIG. 6, and FIG. 6 is a detailed flow chart of step S303 in FIG. 3.

As shown in FIG. 6, the step S303 includes:
Step S3031: combine the key information about the unmanned aerial vehicle, the key information about the master controller, and a temporary code to generate the temporary pairing information after receiving the slave pairing request forwarded by the master controller.

Specifically, when the unmanned aerial vehicle receives the slave pairing request forwarded by the master controller, the unmanned aerial vehicle generates temporary pairing information, wherein the temporary pairing information generated by the unmanned aerial vehicle further includes a temporary code in addition to the key information about the unmanned aerial vehicle, the temporary code serving as an access certificate of the slave controller; and when the unmanned aerial vehicle generates the temporary pairing information, the key information about the unmanned aerial vehicle itself, the key information about the master controller and the temporary code are also combined at the same time to generate combined temporary pairing information.

Step S304: Acquire the temporary pairing information transmitted by the slave controller after the master controller transmits the temporary pairing information to the slave controller, wherein the temporary pairing information transmitted by the slave controller is obtained by the slave controller combining key information about the unmanned aerial vehicle and key information about the slave controller.

Specifically, referring to FIG. 7, FIG. 7 is a detailed flow chart of step S304 in FIG. 3.

As shown in FIG. 7, the step S304 includes:
step S3041: acquire the temporary pairing information transmitted by the second application corresponding to the slave controller after the first application corresponding to the master controller transmits the temporary pairing information to the second application corresponding to the slave controller.

Specifically, a first application corresponding to the master controller transmits temporary pairing information about the unmanned aerial vehicle to a second application corresponding to the slave controller, wherein the temporary pairing information is obtained by the unmanned aerial vehicle combining key information about the unmanned aerial vehicle, key information about the master controller and a temporary code; after the first application corresponding to the master controller receives the temporary pairing information transmitted by the unmanned aerial vehicle, the first application corresponding to the master controller transmits the temporary pairing information to the second application corresponding to the slave controller, wherein the temporary pairing information includes combined temporary pairing information and a temporary pairing; and after receiving the temporary pairing information transmitted by the first application corresponding to the master controller from the second application corresponding to the slave controller, transmitting the temporary pairing information to the unmanned aerial vehicle from the second application corresponding to the slave controller, wherein the temporary pairing information transmitted to the unmanned aerial vehicle from the second application corresponding to the slave controller is obtained by the slave controller combining the key information about the unmanned aerial vehicle and the key information about the slave controller.

Step S305: Establish a slave pairing relationship between the slave controller and the unmanned aerial vehicle according to the temporary pairing information transmitted by the slave controller.

Figure 8:
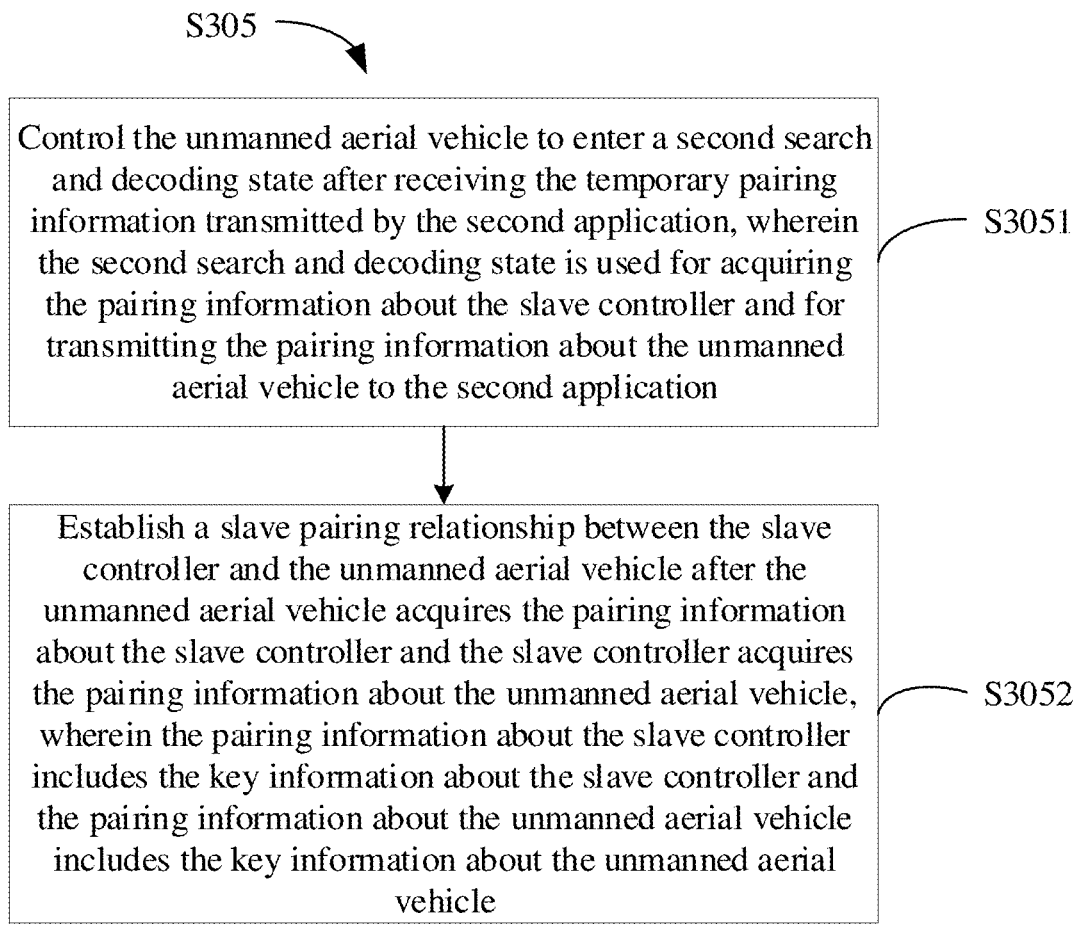
FIG. 8 is a detailed flow chart of step S305 in FIG. 3.

Specifically, referring to FIG. 8, FIG. 8 is a detailed flow chart of step S305 in FIG. 3;

As shown in FIG. 8, the step S305 includes:
step S3051: control the unmanned aerial vehicle to enter a second search and decoding state after receiving the temporary pairing information transmitted by the second application, wherein the second search and decoding state is used for acquiring the pairing information about the slave controller and for transmitting the pairing information about the unmanned aerial vehicle to the second application.

Specifically, after the unmanned aerial vehicle receives the temporary pairing information about the slave controller transmitted by the second application, the interaction between the temporary pairing information about the slave controller and the temporary pairing information about the unmanned aerial vehicle is triggered to control the unmanned aerial vehicle to enter a second search and decoding state, wherein the second search and decoding state is a frequency scanning process performed on the basis of the LTE protocol, and the unmanned aerial vehicle searches for valid data in the temporary pairing information about the slave controller by scanning valid frequency points, decodes same, and acquires the decoded temporary pairing information; after obtaining the decoded temporary pairing information about the slave controller, the unmanned aerial vehicle transmits the temporary pairing information about the unmanned aerial vehicle to a second application corresponding to the slave controller.

Step S3052: Establish a slave pairing relationship between the slave controller and the unmanned aerial vehicle after the unmanned aerial vehicle acquires the pairing information about the slave controller and the slave controller acquires the pairing information about the unmanned aerial vehicle, wherein the pairing information about the slave controller includes the key information about the slave controller and the pairing information about the unmanned aerial vehicle includes the key information about the unmanned aerial vehicle.

Specifically, when the unmanned aerial vehicle acquires the temporary pairing information about the slave controller after decoding, and after the slave controller acquires the temporary pairing information about the unmanned aerial vehicle, at this time, since the unmanned aerial vehicle and the slave controller have performed parameter interaction via the WiFi, which device is allowed to access is pre-set at the slave controller terminal or the unmanned aerial vehicle end, and at this time, it is only necessary to perform pairing of the two sides of the temporary pairing information via the interaction information to determine whether it is a device with a pre-set access, and if the pairing of the temporary pairing information is successful, a slave pairing relationship between the slave controller and the unmanned aerial vehicle is established.

By acquiring the pairing information transmitted by the master controller, the master controller is paired first, and then the slave controller is paired using the temporary pairing information, the present application can solve the problem of easy mis-pairing when a plurality of sets of unmanned aerial vehicles are paired at the same time, and improve the reliability and stability in the process of unmanned aerial vehicles pairing.

Figure 9:
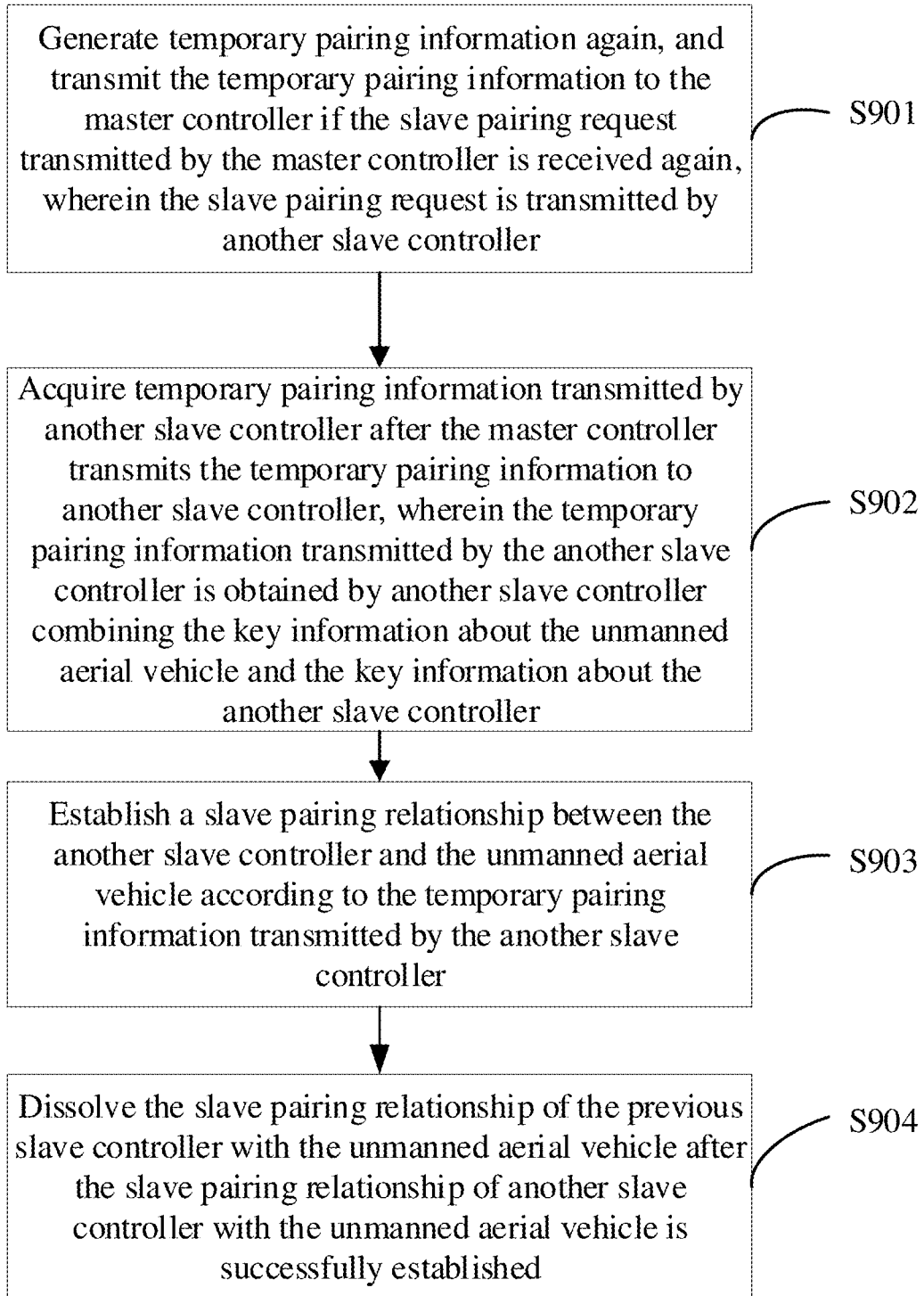
FIG. 9 is a schematic diagram showing a pairing flow when a slave pairing request transmitted by a master controller is received again according to Embodiment 1 of the present application.

Referring to FIG. 9, FIG. 9 is a schematic diagram showing a pairing flow when a slave pairing request transmitted by a master controller is received again according to Embodiment 1 of the present application, include:

step S901: generate temporary pairing information again, and transmit the temporary pairing information to the master controller if the slave pairing request transmitted by the master controller is received again, wherein the slave pairing request is transmitted by another slave controller.

Specifically, when another slave controller wants to join the unmanned aerial vehicle, another slave controller transmits a slave pairing request to the master controller, and the master controller receives the pairing request and forwards same to the unmanned aerial vehicle; at this time, the unmanned aerial vehicle regenerates new temporary pairing information, and transmits the temporary pairing information to the master controller.

Step S902: Acquire temporary pairing information transmitted by another slave controller after the master controller transmits the temporary pairing information to another slave controller, wherein the temporary pairing information transmitted by the another slave controller is obtained by another slave controller combining the key information about the unmanned aerial vehicle and the key information about the another slave controller.

Specifically, after the master controller transmits the temporary pairing information to another slave controller, the temporary pairing information transmitted by another slave controller is acquired, wherein the temporary pairing information transmitted by another slave controller is obtained by another slave controller combining the key information about the unmanned aerial vehicle and the key information about the another slave controller to complete the parameter interaction of the pairing information.

Step S903: Establish a slave pairing relationship between the another slave controller and the unmanned aerial vehicle according to the temporary pairing information transmitted by the another slave controller.

Specifically, according to the temporary pairing information transmitted by another slave controller, a slave pairing relationship between another slave controller and the unmanned aerial vehicle is established. For the contents of the specific pairing step, please refer to the relevant description in the above-mentioned embodiments, which will not be described in detail herein.

Step S904: Dissolve the slave pairing relationship of the previous slave controller with the unmanned aerial vehicle after the slave pairing relationship of another slave controller with the unmanned aerial vehicle is successfully established.

Specifically, after the slave pairing relationship of another slave controller with the unmanned aerial vehicle is successfully established, the previous slave controller will automatically exit the pairing system to release the slave pairing relationship of the previous slave controller with the unmanned aerial vehicle.

In an embodiment of the present application, the master controller corresponds to a master control power, and the master control power corresponds to a first authority of the unmanned aerial vehicle; the slave controller corresponds to a slave control right, and the slave control authority corresponds to a second authority of the unmanned aerial vehicle; wherein the first authority includes a flight control authority, a pan-tilt control authority and a viewing authority, for example: a pan-tilt orientation control, pan-tilt locking, pan-tilt camera zooming, pan-tilt resetting, parameter viewing of an unmanned aerial vehicle, and the like, wherein the second authority includes a viewing authority, for example: viewing a video stream, flight real-time parameters and an airline track of the unmanned aerial vehicle, wherein the flight real-time parameters include, but are not limited to, parameters such as a current coordinate position, height, speed, distance, air point, pan-tilt angle and camera state of the unmanned aerial vehicle.

In some alternative embodiments of the present application, an application (APP) may be provided on the controller to control the unmanned aerial vehicle, and may also be provided on a hand-held terminal to control the unmanned aerial vehicle via the controller; the input of the pairing code can be a manual input or a code scanning input; in a case where the controller entity is unchanged, no pairing code intervention is required, e.g: the slave controller wants to become a master controller, and the master controller becomes a slave controller or the like; if there is a new controller to access and replace the previous slave controller, the pairing code will be regenerated. It needs to be noted that the master-slave controller switch is only the switch in software function, and the connection entity has not changed, for example: a controller A is a master controller, a controller B is a slave controller, and the controller A has the authority of operating an unmanned aerial vehicle and controlling a pan-tilt, while the controller B does not, and the controller B only has the function of viewing an image display. When the controller B wants to control the unmanned aerial vehicle, the controller B needs to apply, and after the application is passed, the master-slave controller is switched; if there is a new controller to access, the previous slave controller is replaced, and then a pairing code needs to be regenerated; if the master controller is replaced, it is necessary to re-scan the WiFi of the master controller for re-access, or key pairing access.

It will be appreciated that if a controller is connected to an unmanned aerial vehicle and the unmanned aerial vehicle is not communicatively coupled to other controllers at that time, the controller device automatically gains master control.

According to an embodiment of the present application, an unmanned aerial vehicle is communicatively coupled to a master controller, pairing information transmitted by the master controller is acquired; according to the pairing information transmitted by the master controller, a master pairing relationship between the master controller and the unmanned aerial vehicle is established; a slave pairing request forwarded by the master controller is received, temporary pairing information is generated, and the temporary pairing information is transmitted to the master controller; after the master controller transmits the temporary pairing information to the slave controller, the temporary pairing information transmitted by the slave controller is acquired; according to the temporary pairing information transmitted by the slave controller, a slave pairing relationship between the slave controller and the unmanned aerial vehicle is established to solve the technical problem that when a plurality of sets of unmanned aerial vehicles are paired at the same time, the mis-pairing is easy to occur, and the traditional key pairing must ensure that the unmanned aerial vehicle is on the ground, resulting in an inflexible pairing scheme, so that the unmanned aerial vehicle can dynamically pair and join on the ground without on the sky, and can safely and reliably perform one-to-one or one-to-many pairing to satisfy the unmanned aerial vehicle to join or exit pairing when pairing in the flight process, and to achieve dynamic pairing so that the pairing flexibility is higher.

It should be noted that the application scenario of the embodiment of the present application is the same as the application scenario of the above-mentioned Embodiment 1, and reference can be made to the contents provided in the above-mentioned Embodiment 1 for details, and the description thereof will not be repeated here.

Figure 10:
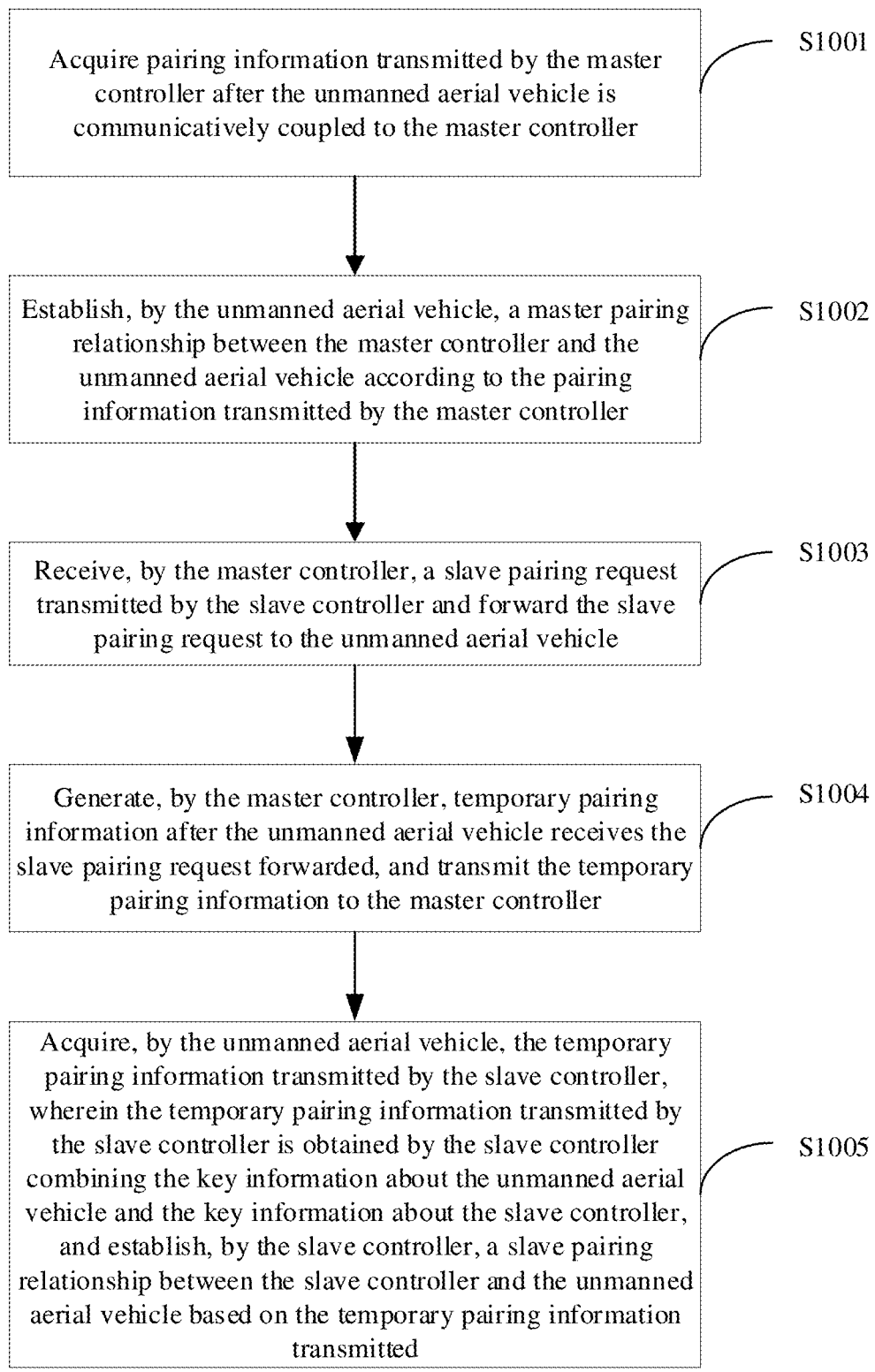
FIG. 10 is a flow chart of a pairing method for an unmanned aerial vehicle according to Embodiment 2 of the present application.

Referring to FIG. 10, FIG. 10 is a flow chart of a pairing method for an unmanned aerial vehicle according to Embodiment 2 of the present application;

as shown in FIG. 10, flow of the pairing method for the unmanned aerial vehicle includes:

Step S1001: acquire pairing information transmitted by the master controller after the unmanned aerial vehicle is communicatively coupled to the master controller.

Specifically, the unmanned aerial vehicle and the master controller are communicatively coupled based on a preset communication protocol, for example: a TCP communication protocol, a UDP communication protocol and a Netty communication protocol, wherein after the unmanned aerial vehicle is communicatively coupled to the master controller, the unmanned aerial vehicle acquires pairing information transmitted by the master controller, the pairing information is a pairing parameter, and the pairing parameter includes a pairing code and an internal parameter of a Modem, wherein the pairing code is used for interfacing with the slave controller, and the internal parameter includes a working transmission rate, an amplitude modulation parameter, a frequency modulation parameter and a phase modulation parameter, and the like.

Step S1002: Establish, by the unmanned aerial vehicle, a master pairing relationship between the master controller and the unmanned aerial vehicle according to the pairing information transmitted by the master controller.

Specifically, after the unmanned aerial vehicle receives the pairing information transmitted by the master controller, controlling the unmanned aerial vehicle to enter a first search and decoding state, wherein the first search and decoding state is used for acquiring the pairing information about the master controller, and for transmitting the pairing information about the unmanned aerial vehicle to the master controller; after the unmanned aerial vehicle acquires the pairing information about the master controller, and the master controller acquires the pairing information about the unmanned aerial vehicle, establishing a master pairing relationship between the master controller and the unmanned aerial vehicle, wherein the pairing information about the master controller includes key information about the master controller; the pairing information about the unmanned aerial vehicle includes key information about the unmanned aerial vehicle.

Step S1003: Receive, by the master controller, a slave pairing request transmitted by the slave controller and forward the slave pairing request to the unmanned aerial vehicle.

Specifically, if a slave controller wants to access the unmanned aerial vehicle, first, the slave controller transmits a slave pairing request to the master controller, and after receiving the slave pairing request transmitted by the slave controller, the master controller forwards the slave pairing request transmitted by the slave controller to the unmanned aerial vehicle.

Step S1004: Generate, by the master controller, temporary pairing information after the unmanned aerial vehicle receives the slave pairing request forwarded, and transmit the temporary pairing information to the master controller.

Specifically, when the unmanned aerial vehicle receives the slave pairing request forwarded by the master controller, the unmanned aerial vehicle generates temporary pairing information at this time, wherein the temporary pairing information generated by the unmanned aerial vehicle further includes a temporary code in addition to the key information about the unmanned aerial vehicle, the temporary code serving as an access certificate of the slave controller; and when the unmanned aerial vehicle generates the temporary pairing information, the key information about the unmanned aerial vehicle itself, the key information about the master controller and the temporary code are also combined at the same time to generate combined temporary pairing information. The unmanned aerial vehicle transmits the combined temporary pairing information to the master controller, and the temporary pairing information is obtained by the unmanned aerial vehicle combining key information about the unmanned aerial vehicle, key information about the master controller and a temporary code. At this time, when the master controller receives the combined temporary pairing information transmitted by the unmanned aerial vehicle, the master controller transmits the temporary pairing information to a slave controller, wherein the temporary pairing information transmitted by the master controller to the slave controller includes the combined temporary pairing information and a temporary pairing code. After receiving, by the slave controller, the temporary pairing information transmitted by the master controller, the slave controller transmits the temporary pairing information to the unmanned aerial vehicle, wherein the temporary pairing information transmitted by the slave controller to the unmanned aerial vehicle is obtained by the slave controller combining the key information about the unmanned aerial vehicle and the key information about the slave controller.

Step S1005: Acquire, by the unmanned aerial vehicle, the temporary pairing information transmitted by the slave controller, wherein the temporary pairing information transmitted by the slave controller is obtained by the slave controller combining the key information about the unmanned aerial vehicle and the key information about the slave controller, and establish, by the slave controller, a slave pairing relationship between the slave controller and the unmanned aerial vehicle based on the temporary pairing information transmitted.

Specifically, after the slave controller receives the temporary pairing information transmitted by the master controller, since the temporary pairing code in the temporary pairing information serves as a certificate for the slave controller to access the unmanned aerial vehicle, at this time, the slave controller combines the key information about the slave controller and the key information about the unmanned aerial vehicle to generate the temporary pairing information about the slave controller, and at this time, the slave controller transmits the temporary pairing information about the slave controller to the unmanned aerial vehicle. After acquiring the temporary pairing information transmitted by the slave controller, the unmanned aerial vehicle triggers the interaction between the temporary pairing information about the slave controller and the temporary pairing information about the unmanned aerial vehicle to control the unmanned aerial vehicle to enter a second search and decoding state, wherein the second search and decoding state is a frequency scanning process based on an LTE protocol; the unmanned aerial vehicle searches for valid data in the temporary pairing information about the slave controller by scanning a valid frequency point, and decodes same to acquire decoded temporary pairing information; and when the decoded temporary pairing information about the slave controller is acquired, the unmanned aerial vehicle transmits the temporary pairing information about the unmanned aerial vehicle to the slave controller; at this time, when the unmanned aerial vehicle acquires the temporary pairing information about the slave controller after decoding, and after the slave controller acquires the temporary pairing information about the unmanned aerial vehicle, at this time, since the unmanned aerial vehicle and the slave controller have performed parameter interaction via the WiFi, which device is allowed to access is pre-set at the slave controller terminal or the unmanned aerial vehicle end, and at this time, it is only necessary to perform pairing of the two sides of the temporary pairing information via the interaction information to determine whether it is a device with a pre-set access, and if the pairing of the temporary pairing information is successful, a slave pairing relationship between the slave controller and the unmanned aerial vehicle is established.

It should be noted that preferred embodiments of an embodiment of the present application can be described referring to the above-mentioned embodiments, and the description thereof will not be repeated here.

Figure 11:
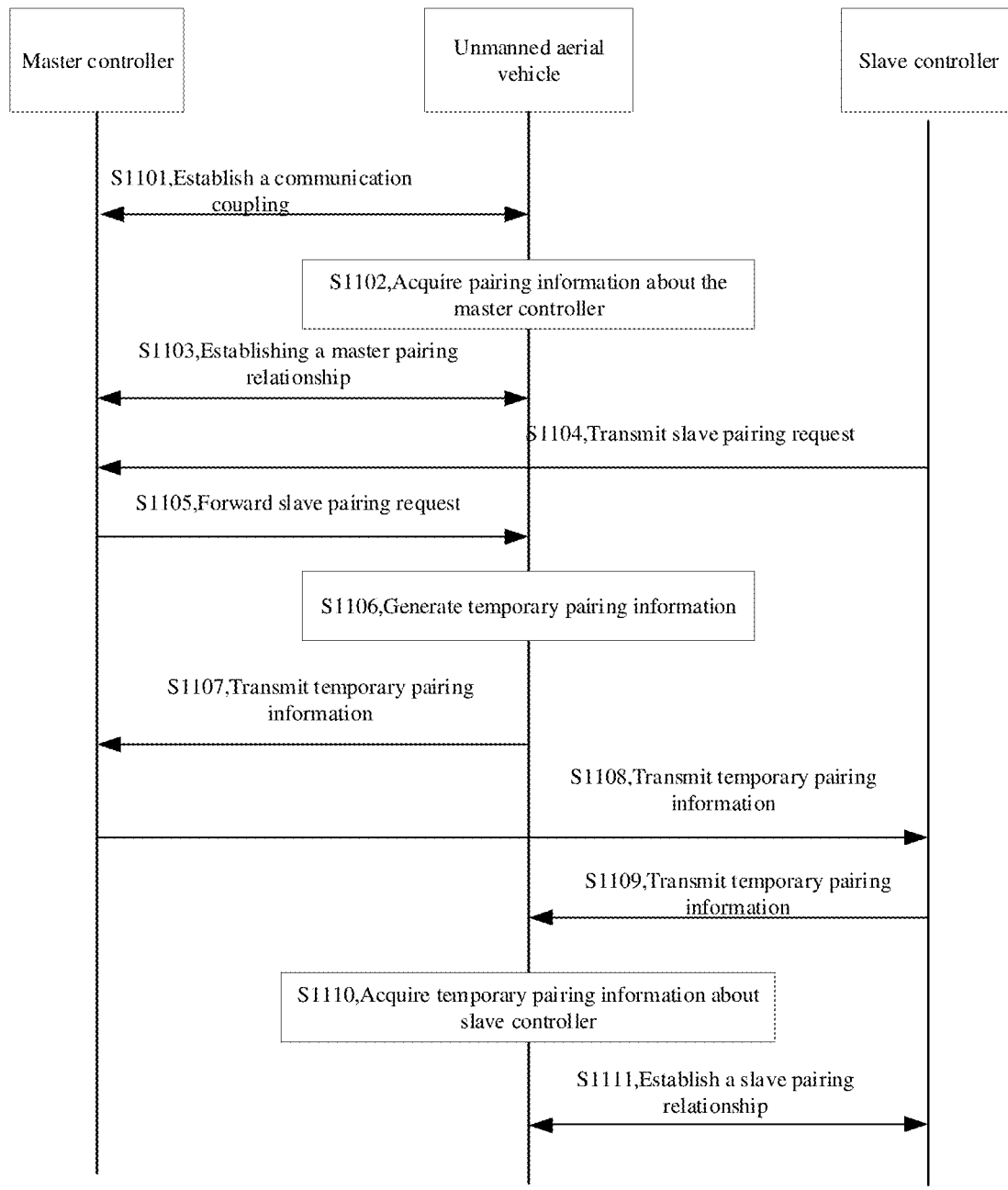
FIG. 11 is a flow chart of a pairing method for an unmanned aerial vehicle according to Embodiment 2 of the present application.

Referring to FIG. 11, FIG. 11 is a flow chart of a pairing method for an unmanned aerial vehicle according to Embodiment 2 of the present application.

The pairing method for the unmanned aerial vehicle is applied to the unmanned aerial vehicle, and in particular, the execution subject of the pairing method for the unmanned aerial vehicle is one or more processors of the unmanned aerial vehicle.

As shown in FIG. 11, the pairing method for the unmanned aerial vehicle includes:

step S1101: establish a communication coupling.

Specifically, the master controller and the unmanned aerial vehicle establish a communication coupling based on a preset communication protocol, for example: a TCP communication protocol, a UDP communication protocol, and a Netty communication protocol.

Step S1102: Acquire pairing information about a master controller.

Specifically, the unmanned aerial vehicle acquires pairing information about the master controller, wherein the pairing information is a pairing parameter, and the pairing parameter includes a pairing code and an internal parameter of a Modem, wherein the pairing code is used for interfacing with the slave controller, and the internal parameter includes a working transmission rate, an amplitude modulation parameter, a frequency modulation parameter and a phase modulation parameter, and the like.

Step S1103: Establish a master pairing relationship.

Specifically, the master controller and the unmanned aerial vehicle enter a search and decoding state and establish a master pairing relationship; specifically, after the unmanned aerial vehicle receives the pairing information transmitted by the master controller, the unmanned aerial vehicle is controlled to enter a first search and decoding state, wherein the unmanned aerial vehicle is used for acquiring the pairing information about the master controller, and for transmitting the pairing information about the unmanned aerial vehicle to the master controller; after the unmanned aerial vehicle acquires the pairing information about the master controller, and the master controller acquires the pairing information about the unmanned aerial vehicle, establishing a master pairing relationship between the master controller and the unmanned aerial vehicle, wherein the pairing information about the master controller includes key information about the master controller; the pairing information about the unmanned aerial vehicle includes key information about the unmanned aerial vehicle.

Step S1104: Transmit a slave pairing request.

Specifically, if other controllers want to access the unmanned aerial vehicle, the slave controller transmits a slave pairing request to the master controller.

Step S1105: Forward the slave pairing request.

Specifically, the master controller forwards the slave pairing request to the unmanned aerial vehicle, and when the master controller receives the slave pairing request transmitted by the slave controller, forwards the slave pairing request to the unmanned aerial vehicle by the slave controller.

Step S1106: Generate temporary pairing information.

Specifically, the unmanned aerial vehicle generates temporary pairing information, wherein the temporary pairing information generated by the unmanned aerial vehicle further includes a temporary code in addition to the key information about the unmanned aerial vehicle, the temporary code serving as an access certificate of the slave controller; and when the unmanned aerial vehicle generates the temporary pairing information, the key information about the unmanned aerial vehicle itself, the key information about the master controller and the temporary code are also combined at the same time to generate temporary pairing information.

Step S1107: Transmit temporary pairing information.

Specifically, the unmanned aerial vehicle transmits the temporary pairing information to the master controller, wherein the temporary pairing information transmitted to the master controller is obtained by the unmanned aerial vehicle combining the key information about the unmanned aerial vehicle, the key information about the master controller, and the temporary code.

Step S1108: Transmit temporary pairing information.

Specifically, after the master controller receives the combined temporary pairing information transmitted by the unmanned aerial vehicle, the master controller transmits the temporary pairing information to the slave controller, wherein the temporary pairing information transmitted by the master controller to the slave controller includes the temporary pairing information transmitted by the unmanned aerial vehicle to the master controller and a temporary pairing code.

Step S1109: Transmit temporary pairing information.

Specifically, after receiving, by the slave controller, the temporary pairing information transmitted by the master controller, the slave controller transmits the temporary pairing information to the unmanned aerial vehicle, wherein the temporary pairing information transmitted by the slave controller to the unmanned aerial vehicle is obtained by the slave controller combining the key information about the unmanned aerial vehicle and the key information about the slave controller.

Step S1110: Acquire pairing information about a slave controller.

Specifically, the unmanned aerial vehicle acquires the temporary pairing information transmitted from the slave controller, wherein when the unmanned aerial vehicle receives the temporary pairing information transmitted from the slave controller, interaction of the temporary pairing information about the slave controller and the temporary pairing information about the unmanned aerial vehicle is triggered, thereby controlling the unmanned aerial vehicle to enter the second search and decoding state. wherein the second search and decoding state is a frequency scanning process performed on the basis of the LTE protocol, and the unmanned aerial vehicle searches for valid data in the temporary pairing information about the slave controller by scanning valid frequency points, decodes same, and ac quires the decoded temporary pairing information; after obtaining the decoded temporary pairing information about the slave controller, the unmanned aerial vehicle transmits the temporary pairing information about the unmanned aerial vehicle to a slave controller.

Step S1111: Establish a slave pairing relationship.

Specifically, when the unmanned aerial vehicle acquires the temporary pairing information about the slave controller after decoding, and after the slave controller acquires the temporary pairing information about the unmanned aerial vehicle, since the unmanned aerial vehicle and the slave controller have performed parameter interaction via the WiFi, which device is allowed to access is pre-set at the slave controller terminal or the unmanned aerial vehicle end, and at this time, it is only necessary to perform pairing of the two sides of the temporary pairing information via the interaction information to determine whether it is a device with a pre-set access, and if the pairing of the temporary pairing information is successful, a slave pairing relationship between the slave controller and the unmanned aerial vehicle is established.

According to an embodiment of the present application, the pairing information transmitted by a master controller is acquired after an unmanned aerial vehicle is communicatively coupled to the master controller; a master pairing relationship is established between the master controller and the unmanned aerial vehicle according to the pairing information transmitted by the master controller; a slave pairing request forwarded by the master controller is received, temporary pairing information is generated, and the temporary pairing information is transmitted to the master controller; after the master controller transmits the temporary pairing information to the slave controller, the temporary pairing information transmitted by the slave controller is acquired; and a slave pairing relationship between the slave controller and the unmanned aerial vehicle is established according to the temporary pairing information transmitted by the slave controller. After the completion of pairing, both the master and slave controllers can control the unmanned aerial vehicle, and can receive images at the same time. Such a design can not only reliably pair, and will not be interfered by other pairing combinations, but also can pair and access at any time in the flight process. It is very useful and flexible for the need to switch the controller scenario due to controller abnormality or low power, and the like. It solves the technical problem that when a plurality of sets of unmanned aerial vehicles are paired at the same time, the mis-pairing easily occurs, and the traditional key pairing must ensure that the unmanned aerial vehicle is on the ground, resulting in an inflexible pairing scheme, improving the reliability and stability of unmanned aerial vehicle pairing process.

Figure 12:
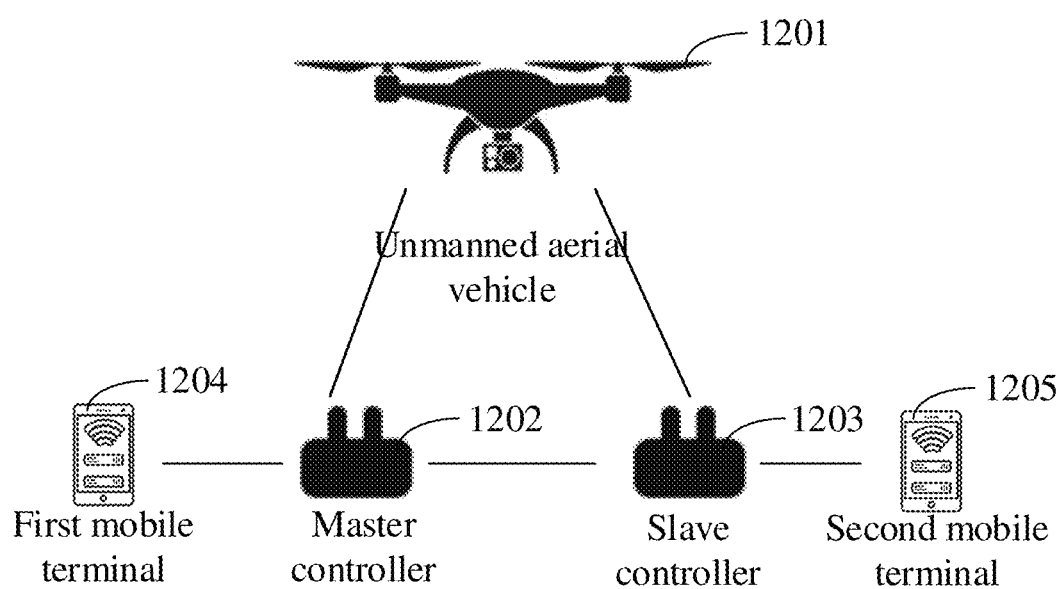
FIG. 12 is a schematic diagram showing an application scenario provided in Embodiment 3 of the present application.

Referring to FIG. 12, FIG. 12 is a schematic diagram showing an application scenario provided by Embodiment 3 of the present application.

As shown in FIG. 12, the application scenario includes an unmanned aerial vehicle 1201, a master controller 1202, a slave controller 1203, a first mobile terminal 1204 and a second mobile terminal 1205, wherein both the master controller 1202 and the slave controller 1203 are in communication coupling with the unmanned aerial vehicle 1201, and the master controller 1202 and the slave controller 1203 are in communication coupling, and the unmanned aerial vehicle 1201 and the master controller 1202, the slave controller 1203 or both the master controller 1202 and the slave controller 1203 are in communication coupling based on a pre-set communication protocol, for example: a TCP communication protocol, a UDP communication protocol, and a Netty communication protocol. The first mobile terminal 1204 is communicatively coupled to the master controller 1202, for example: communication coupling is performed based on a preset communication protocol, such as: a TCP communication protocol, a UDP communication protocol, and a Netty communication protocol. The second mobile terminal 1205 is communicatively coupled to the slave controller 1203, for example: communication coupling is performed based on a preset communication protocol, such as: a TCP communication protocol, a UDP communication protocol, and a Netty communication protocol.

Figure 13:
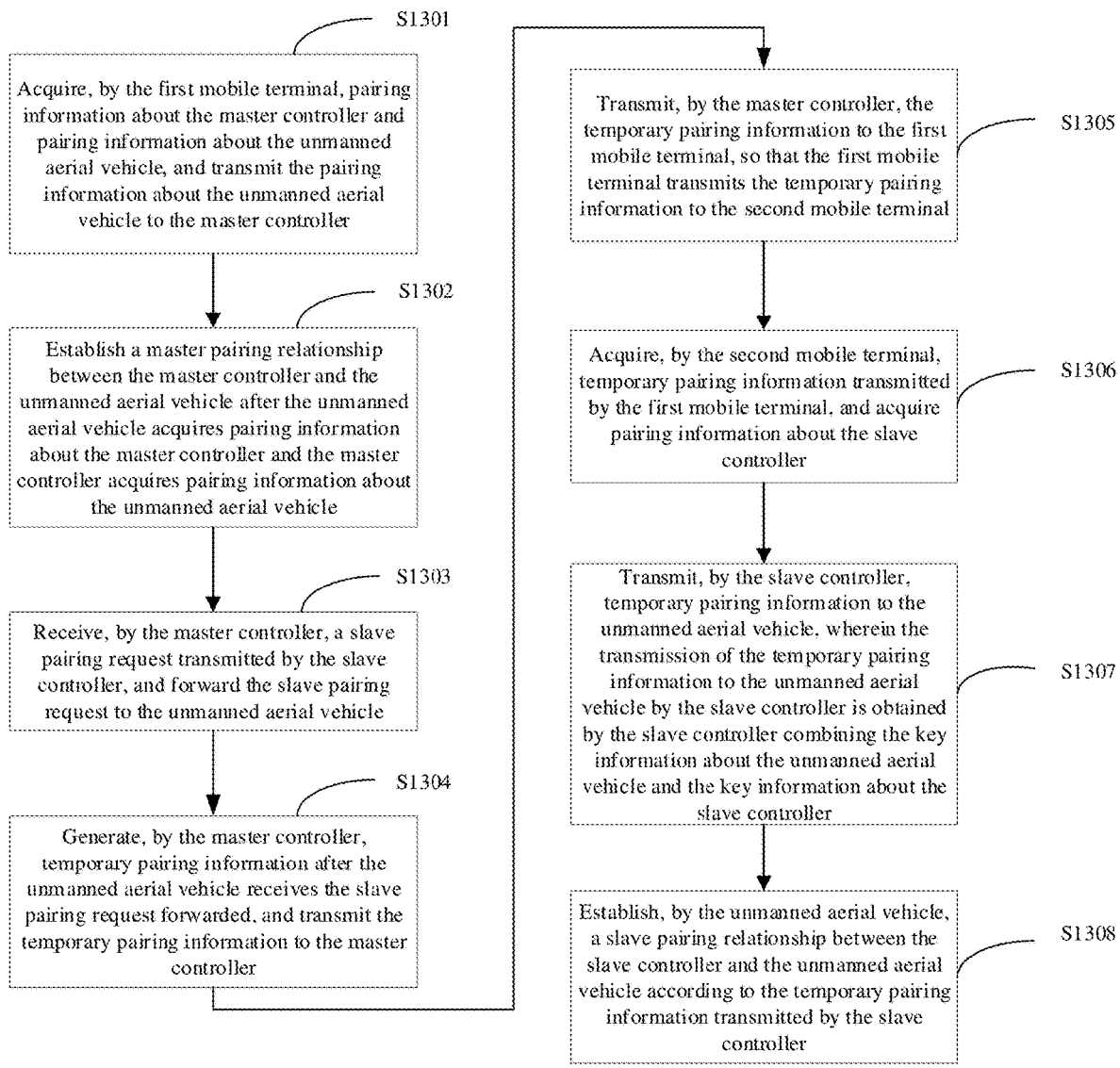
FIG. 13 is a flow chart of a pairing method for an unmanned aerial vehicle according to Embodiment 3 of the present application.

Referring to FIG. 13, FIG. 13 is a schematic flow diagram showing a pairing method for an unmanned aerial vehicle according to an embodiment of the present application.

The pairing method for the unmanned aerial vehicle is applied to the unmanned aerial vehicle, and in particular, the execution subject of the pairing method for the unmanned aerial vehicle is one or more processors of the unmanned aerial vehicle.

As shown in FIG. 13, the pairing method for the unmanned aerial vehicle includes:

Step S1301: acquire, by the first mobile terminal, pairing information about the master controller and pairing information about the unmanned aerial vehicle, and transmit the pairing information about the unmanned aerial vehicle to the master controller.

Specifically, the first mobile terminal acquires a communication coupling with the unmanned aerial vehicle by scanning a WiFi two-dimensional code corresponding to the unmanned aerial vehicle, acquires pairing information about the master controller, and at the same time acquires pairing information about the unmanned aerial vehicle, and at this time, the first mobile terminal transmits the pairing information about the unmanned aerial vehicle to the master controller.

In some embodiments of the present application, the first mobile terminal is provided with an application, wherein the first mobile terminal may be a remote controller directly connected to the unmanned aerial vehicle or may be a tablet. In an embodiment of the present application, the first mobile terminal is installed with an application, and when the application performs communication coupling of the unmanned aerial vehicle by scanning a WiFi two-dimensional code of the unmanned aerial vehicle, the application can acquire pairing information about the unmanned aerial vehicle, and at the same time, the unmanned aerial vehicle can also acquire pairing information about the master controller.

Step S1302: Establish a master pairing relationship between the master controller and the unmanned aerial vehicle after the unmanned aerial vehicle acquires pairing information about the master controller and the master controller acquires pairing information about the unmanned aerial vehicle.

Specifically, after the unmanned aerial vehicle acquires the pairing information about the master controller, and after the master controller acquires the pairing information about the unmanned aerial vehicle, it is equivalent to a case where the master controller and the pairing information about the unmanned aerial vehicle interact; at this time, a search and decoding state is entered; by scanning a valid frequency point, valid data in the pairing information about the master controller is searched and decoded, and the decoded pairing information is acquired; and after the pairing information about the decoded master controller is acquired, the unmanned aerial vehicle transmits the pairing information about the unmanned aerial vehicle itself to the master controller, and at this time, since the unmanned aerial vehicle and the master controller have exchanged pairing information after decoding via the WiFi, which device is allowed to access is pre-set at the master controller terminal or the unmanned aerial vehicle end; at this time, only by performing pairing of pairing information between the two sides via information exchange, it can be determined whether it is a device with pre-set access; and if the pairing information is successfully matched, a master pairing relationship between the master controller and the unmanned aerial vehicle is established, wherein the master controller pairing information includes key information about the master controller, and the pairing information about the unmanned aerial vehicle includes the key information about the unmanned aerial vehicle.

Step S1303: Receive, by the master controller, a slave pairing request transmitted by the slave controller, and forward the slave pairing request to the unmanned aerial vehicle.

Specifically, if a slave controller wants to access the unmanned aerial vehicle, first, the slave controller transmits a slave pairing request to the master controller, and after receiving the slave pairing request transmitted by the slave controller, the master controller forwards the slave pairing request transmitted by the slave controller to the unmanned aerial vehicle.

Step S1304: Generate, by the master controller, temporary pairing information after the unmanned aerial vehicle receives the slave pairing request forwarded, and transmit the temporary pairing information to the master controller.

Specifically, after the unmanned aerial vehicle receives the slave pairing request forwarded by the master controller, the unmanned aerial vehicle generates temporary pairing information at this time, wherein the temporary pairing information generated by the unmanned aerial vehicle further includes a temporary code in addition to the key information about the unmanned aerial vehicle, the temporary code serving as an access certificate of the slave controller; and when the unmanned aerial vehicle generates the temporary pairing information, the key information about the unmanned aerial vehicle itself, the key information about the master controller and the temporary code are also combined at the same time to generate combined temporary pairing information. The unmanned aerial vehicle transmits temporary pairing information to the master controller, wherein the temporary pairing information transmitted to the master controller is obtained by the unmanned aerial vehicle combining key information about the unmanned aerial vehicle, key information about the master controller and a temporary code.

Step S1305: Transmit, by the master controller, the temporary pairing information to the first mobile terminal, so that the first mobile terminal transmits the temporary pairing information to the second mobile terminal.

Specifically, after the master controller receives the temporary pairing information transmitted from the unmanned aerial vehicle, since the temporary pairing information contains a temporary code, the master controller transmits the temporary code to the first mobile terminal, so that the temporary code thereof is displayed on the image screen of the first mobile terminal as a data certificate for accessing the unmanned aerial vehicle, and at this time, the first mobile terminal corresponding to the master controller transmits the temporary pairing information transmitted from the unmanned aerial vehicle to the second mobile terminal.

Step S1306: Acquire, by the second mobile terminal, temporary pairing information transmitted by the first mobile terminal, and acquire pairing information about the slave controller.

Specifically, after acquiring the temporary pairing information transmitted by the first mobile terminal, the second mobile terminal is equivalent to acquiring, by the slave controller, the temporary pairing information about the unmanned aerial vehicle stored in the temporary pairing information, wherein the temporary pairing information contains the key information and the pairing code of the unmanned aerial vehicle, and at this time, the second mobile terminal corresponding to the slave controller acquires the access channel of the unmanned aerial vehicle by inputting the pairing code on the screen, and at this time, the slave controller corresponding to the second mobile terminal starts to combine the key information about the slave controller and the key information about the unmanned aerial vehicle to generate the temporary pairing information.

In some embodiments of the present application, the controller and the mobile terminal image device (APP) are physically connected, and when the APP of the mobile terminal is connected to the unmanned aerial vehicle via the WiFi, the APP of the mobile terminal can directly acquire the pairing parameters of the unmanned aerial vehicle and the controller, and the unmanned aerial vehicle can also directly acquire the pairing parameters of the controller.

Step S1307: Transmit, by the slave controller, temporary pairing information to the unmanned aerial vehicle, wherein the transmission of the temporary pairing information to the unmanned aerial vehicle by the slave controller is obtained by the slave controller combining the key information about the unmanned aerial vehicle and the key information about the slave controller.

Specifically, after the unmanned aerial vehicle receives the temporary pairing information transmitted from the slave controller, the interaction between the temporary pairing information about the slave controller and the temporary pairing information about the unmanned aerial vehicle is triggered to control the unmanned aerial vehicle to enter a second search and decoding state, wherein the search and decoding state is a frequency scanning process performed on the basis of an LTE protocol, and the second search and decoding state searches for valid data in the temporary pairing information about the slave controller by scanning a valid frequency point, and decodes same to the decoded temporary pairing information; and when the decoded temporary pairing information about the slave controller is obtained, the unmanned aerial vehicle transmits the temporary pairing information about the unmanned aerial vehicle to the slave controller.

Step S1308: Establish, by the unmanned aerial vehicle, a slave pairing relationship between the slave controller and the unmanned aerial vehicle according to the temporary pairing information transmitted by the slave controller.

Specifically, when the unmanned aerial vehicle acquires the temporary pairing information about the slave controller after decoding, and after the slave controller acquires the temporary pairing information about the unmanned aerial vehicle, at this time, since the unmanned aerial vehicle and the slave controller have performed parameter interaction via the WiFi, which device is allowed to access is pre-set at the slave controller terminal or the unmanned aerial vehicle end, at this time, it is only necessary to perform pairing of the two sides of the temporary pairing information via the interaction information to determine whether it is a device with a pre-set access, and if the pairing of the temporary pairing information is successful, a slave pairing relationship between the slave controller and the unmanned aerial vehicle is established, wherein the slave controller temporary pairing information includes key information about the slave controller, and the unmanned aerial vehicle temporary pairing information includes key information about the unmanned aerial vehicle.

Figure 14:
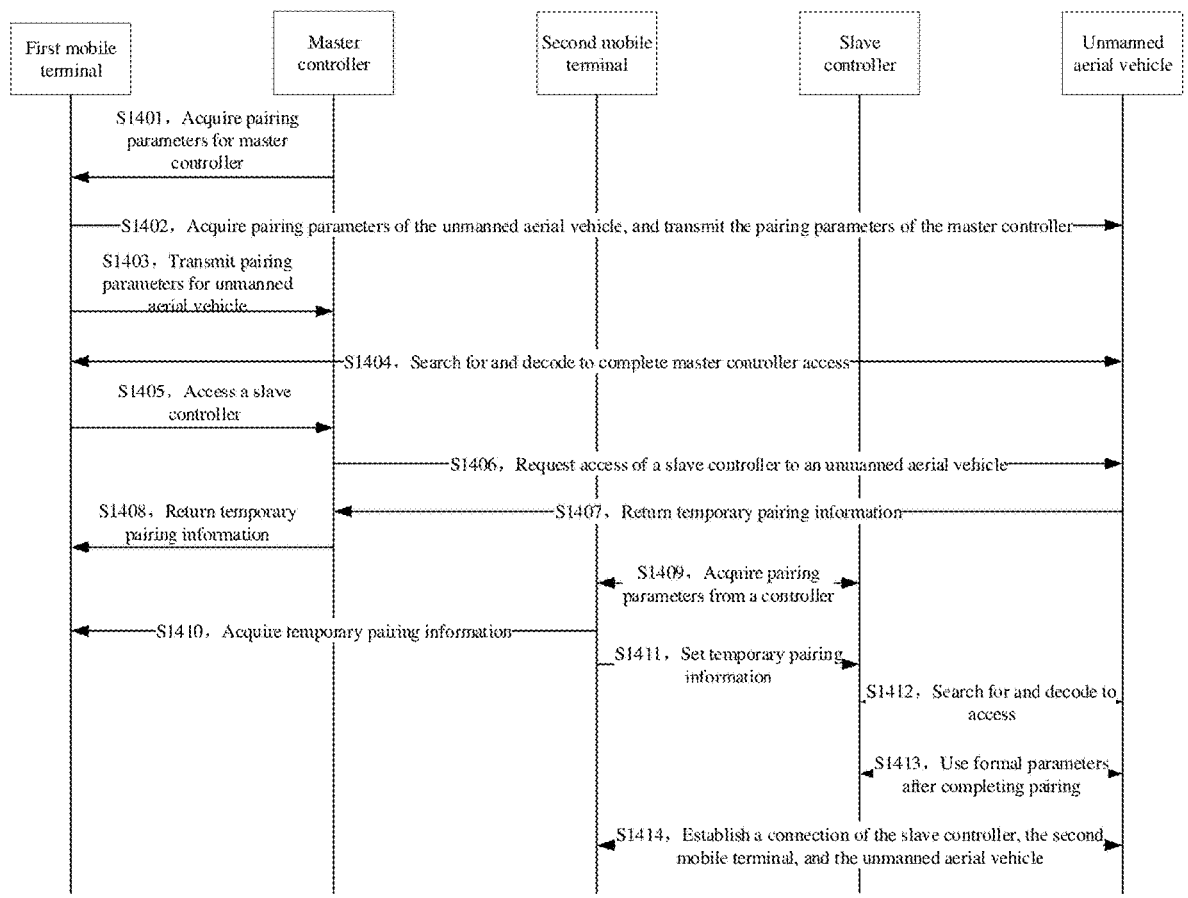
FIG. 14 is a flow chart of a pairing method for an unmanned aerial vehicle according to Embodiment 3 of the present application.

Referring to FIG. 14, FIG. 14 is a flow diagram showing a pairing method for an unmanned aerial vehicle according to an embodiment of the present application.

The pairing method for the unmanned aerial vehicle is applied to the unmanned aerial vehicle, and in particular, the execution subject of the pairing method for the unmanned aerial vehicle is one or more processors of the unmanned aerial vehicle.

As shown in FIG. 14, the pairing method for the unmanned aerial vehicle includes:

step S1401: acquire pairing parameters of a master controller.

Specifically, the master controller transmits the pairing parameter of the master controller to the first mobile terminal, so that the first mobile terminal acquires the pairing parameter of the master controller.

Step S1402: Acquire pairing parameters of the unmanned aerial vehicle and transmit the pairing parameters of the master controller.

Specifically, the first mobile terminal establishes a communication coupling with the unmanned aerial vehicle by scanning a WiFi two-dimensional code of the unmanned aerial vehicle, acquires pairing parameters of the unmanned aerial vehicle, and transmits the pairing parameters of the master controller to the unmanned aerial vehicle.

Step S1403: Transmit pairing parameters of the unmanned aerial vehicle.

Specifically, after acquiring the pairing parameters of the unmanned aerial vehicle, and the first mobile terminal transmits the pairing parameters to the master controller.

Step S1404: Search for and decode to complete master controller access.

Specifically, when the master controller acquires the pairing parameter of the unmanned aerial vehicle, and after the unmanned aerial vehicle acquires the pairing parameter of the master controller, it is equivalent to the pairing information about the two interacting; and after the search and decoding are completed, a connection between the two is established, and the master controller accessing the unmanned aerial vehicle is completed.

Step S1405: access a slave controller.

Specifically, when there is a slave controller to access the unmanned aerial vehicle, the first mobile terminal transmits an access request prompt to the master controller.

Step S1406: Request access of a slave controller from the unmanned aerial vehicle;

Specifically, when the master controller receives an access request from the slave controller, a slave pairing request is transmitted to the unmanned aerial vehicle.

Step S1407: Return temporary pairing information.

Specifically, after the unmanned aerial vehicle generates the temporary pairing information, the temporary pairing information is returned to the master controller, wherein the temporary pairing information generated by the unmanned aerial vehicle further includes a temporary code in addition to the key information about the unmanned aerial vehicle, the temporary code serving as an access certificate of the slave controller; and when the unmanned aerial vehicle generates the temporary pairing information, the key information about the unmanned aerial vehicle itself, the key information about the master controller and the temporary code are also combined at the same time to generate combined temporary pairing information. The returned temporary pairing information is obtained by the unmanned aerial vehicle combining the key information about the unmanned aerial vehicle, the key information about the master controller and the temporary code.

Step S1408: Return temporary pairing information.

Specifically, the master controller returns temporary pairing information to the first mobile terminal, wherein the temporary pairing information is obtained by the unmanned aerial vehicle combining key information about the unmanned aerial vehicle, key information about the master controller and a temporary code.

Step S1409: Acquire pairing parameters of a slave controller.

Specifically, the second mobile terminal acquires pairing parameters of the slave controller, wherein the pairing parameters of the slave controller include key information about the slave controller.

In an embodiment of the present application, a second mobile terminal is installed with a second application, and after the second application establishes a communication coupling with an unmanned aerial vehicle by scanning a WiFi two-dimensional code of the unmanned aerial vehicle, the second application acquires pairing information about the unmanned aerial vehicle, and the unmanned aerial vehicle can also acquire pairing information about a master controller.

Step S1410: Acquire temporary pairing information.

Specifically, the second mobile terminal acquires temporary pairing information about the first mobile terminal, wherein the temporary pairing information about the first mobile terminal is obtained by the unmanned aerial vehicle combining key information about the unmanned aerial vehicle, key information about the master controller and a temporary code.

Step S1411: Set temporary pairing information.

Specifically, after the second mobile terminal acquires the temporary pairing information about the first mobile terminal, the slave controller corresponding to the first mobile terminal combines the key information about the slave controller and the key information about the unmanned aerial vehicle to generate the temporary pairing information.

Step S1412: Search for and decode to access.

Specifically, the slave controller transmits the temporary pairing information to the unmanned aerial vehicle, and enters a search and decoding state, wherein the slave controller transmits the temporary pairing information to the unmanned aerial vehicle, and the slave controller combines the key information about the unmanned aerial vehicle and the key information about the slave controller to obtain the search and decoding state, wherein the search and decoding state is a frequency scanning process performed on the basis of an LTE protocol, and the second search and decoding state searches for valid data in the temporary pairing information about the slave controller by scanning a valid frequency point, and decodes same to the decoded temporary pairing information; and when the decoded temporary pairing information about the slave controller is obtained, the unmanned aerial vehicle transmits the temporary pairing information about the unmanned aerial vehicle to the slave controller.

Step S1413: Use formal parameters after completing pairing.

Specifically, when the decoded temporary pairing information about the slave controller and the temporary pairing information about the unmanned aerial vehicle are compared successfully, the pairing of the slave controller and the unmanned aerial vehicle is completed. When the unmanned aerial vehicle and the slave controller access are successful, after the unmanned aerial vehicle acquires real information about the slave controller, the temporary pairing information is invalid, and the slave controller also uses its own real information to interact with the unmanned aerial vehicle, wherein the real information includes key information about the slave controller, i.e., a real key of the slave controller.

Step S1414: Establish a connection of the slave controller, the second mobile terminal, and the unmanned aerial vehicle.

According to an embodiment of the present application, an unmanned aerial vehicle is communicatively coupled to a master controller, pairing information transmitted by the master controller is acquired; according to the pairing information transmitted by the master controller, a master pairing relationship between the master controller and the unmanned aerial vehicle is established; a slave pairing request forwarded by the master controller is received, temporary pairing information is generated, and the temporary pairing information is transmitted to the master controller; after the master controller transmits the temporary pairing information to the slave controller, the temporary pairing information transmitted by the slave controller is acquired; according to the temporary pairing information transmitted by the slave controller, a slave pairing relationship between the slave controller and the unmanned aerial vehicle is established to solve the technical problem that when a plurality of sets of unmanned aerial vehicles are paired at the same time, the mis-pairing is easy to occur, and the traditional key pairing must ensure that the unmanned aerial vehicle is on the ground, resulting in an inflexible pairing scheme, improving reliability and stability of unmanned aerial vehicle pairing process, so that the unmanned aerial vehicle can dynamically pair and join on the ground without on the sky, and can safely and reliably perform one-to-one or one-to-many pairing to satisfy the unmanned aerial vehicle to join or exit pairing when pairing in the flight process, so that the pairing flexibility is higher.

Figure 15:
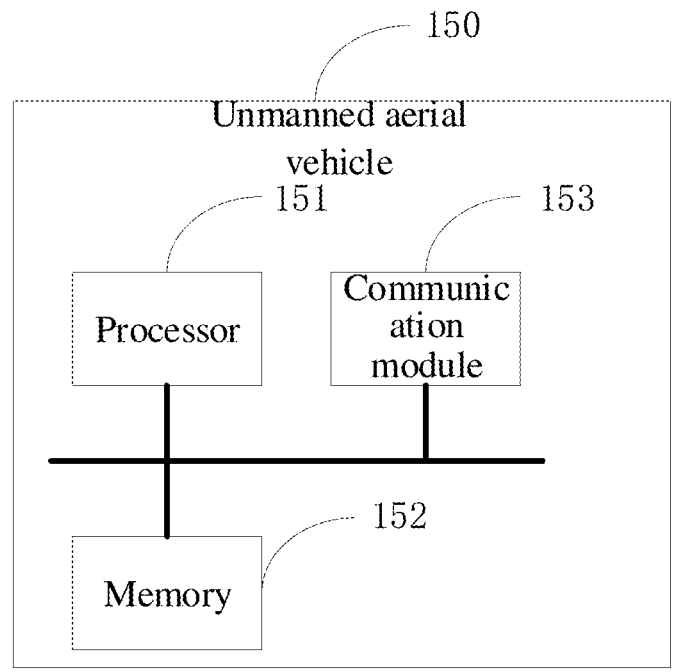
FIG. 15 is a schematic diagram showing an unmanned aerial vehicle according to an embodiment of the present disclosure.

Referring to FIG. 15, FIG. 15 is a schematic diagram showing an unmanned aerial vehicle according to an embodiment of the present disclosure.

As shown in FIG. 15, the unmanned aerial vehicle 150 includes: a processor 151, a memory 152 and a communication module 153. The processor 151, the memory 152 and the communication module 153 establish a communication coupling therebetween by means of a bus.

The processor 151 may be any type of processor having one or more processing cores. It may perform single-threaded or multi-threaded operations for parsing instructions to perform operations such as acquiring data, performing logical operation functions, and issuing operation processing results.

The processor 151 is used for acquiring pairing information transmitted by a master controller after the unmanned aerial vehicle is communicatively coupled to the master controller; establishing a master pairing relationship between a master controller and an unmanned aerial vehicle via pairing information transmitted by the master controller; receiving a slave pairing request forwarded by the master controller, generating temporary pairing information, and transmitting the temporary pairing information to the master controller, wherein the slave pairing request is sent by the slave controller to the master controller; acquiring the temporary pairing information transmitted by the slave controller after the master controller transmits the temporary pairing information to the slave controller, wherein the temporary pairing information transmitted by the slave controller is obtained by the slave controller combining the key information about the unmanned aerial vehicle and the key information about the slave controller; and establishing a slave pairing relationship between the slave controller and the unmanned aerial vehicle according to the temporary pairing information transmitted by the slave controller.

By acquiring the pairing information transmitted by the master controller, the master controller is paired first, and then the slave controller is paired using the temporary pairing information, the present application can solve the problem of easy mis-pairing when a plurality of sets of unmanned aerial vehicles are paired at the same time, and improve the reliability and stability in the process of unmanned aerial vehicles pairing.

The memory 152 serves as a non-transitory computer-readable storage medium for storing non-transitory software programs, non-transitory computer-executable programs, and modules, such as program instructions/modules, corresponding to the pairing method for the unmanned aerial vehicle in an embodiment of the present application. The processor 151 implements the pairing method for the unmanned aerial vehicle in the method embodiments described above by executing non-transient software programs, instructions, and modules stored in the memory 152.

The memory 152 may include a program storage area and a data storage area, wherein the program storage area may store an operating system and an application required by at least one function; the storage data area may store data or the like created according to the use of the remote control apparatus. In addition, the memory 152 may include high speed random access memory and may also include non-transitory memory, such as at least one magnetic disk storage device, flash memory device, or other non-transitory solid state storage devices. In some embodiments, the memory 152 may optionally include memory remotely located relative to the processor 151, which may be connected to the unmanned aerial vehicle via a network. Embodiments of such networks include, but are not limited to, the Internet, Intranets, local area networks, mobile communication networks, and combinations thereof.

The memory 152 stores instructions executable by at least one processor 151; at least one processor 151 is configured to execute instructions to implement the pairing method for the unmanned aerial vehicle in any of the method embodiments described above.

The communication module 153 is a functional module for establishing a communication coupling and providing a physical channel. The communication module 153 may be any type of wireless or wired communication module including, but not limited to, a WiFi module or a Bluetooth module, and the like.

Further, an embodiment of the present application also provides a non-transitory computer-readable storage medium storing computer-executable instructions that, when executed by one or more processors 151, cause the one or more processors 151 to perform a pairing method for an unmanned aerial vehicle in any of the method embodiments described above.

Figure 16:
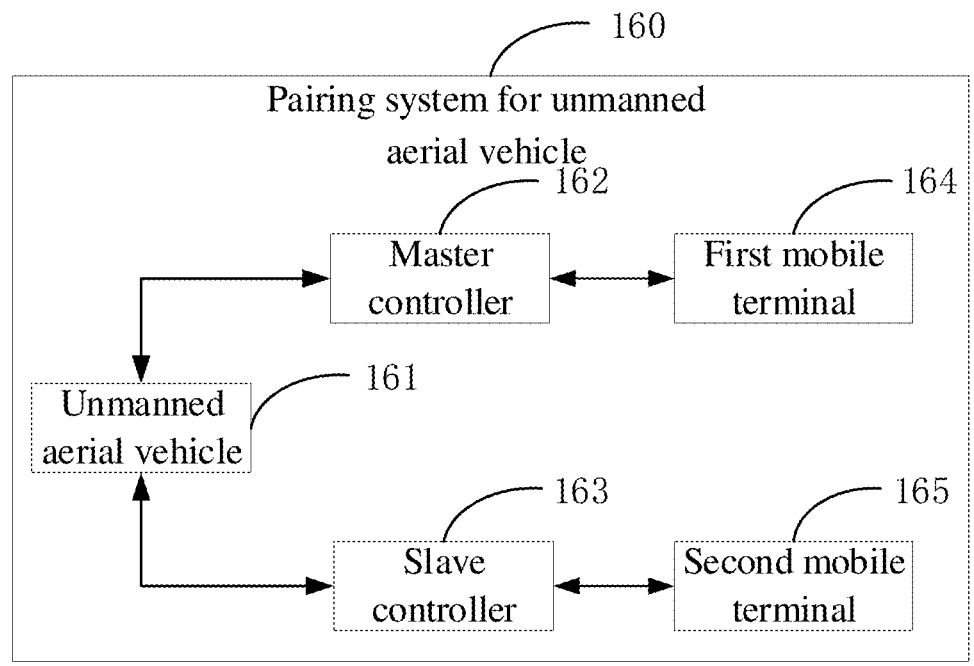
FIG. 16 is a schematic diagram showing a pairing system of an unmanned aerial vehicle according to an embodiment of the present application.

Reference is also made to FIG. 16, FIG. 16 is a structural schematic diagram showing a pairing system of the unmanned aerial vehicle according to an embodiment of the present invention.

As shown in FIG. 16, the pairing system 160 of the unmanned aerial vehicle includes: an unmanned aerial vehicle 161, a master controller 162, a slave controller 163, a first mobile terminal 164, and a second mobile terminal 165.

The master controller 162 and the slave controller 163 in the embodiment of the present application are both connected to an unmanned aerial vehicle 161 via a wireless communication network to realize the control of the unmanned aerial vehicle.

In an embodiment of the present application, in a case where both the master controller and the slave controller are in communication pairing with the unmanned aerial vehicle 160, if the slave controller 163 is to be replaced with the master controller 162, switching between the master controller and the slave controller may be performed directly on the basis of software; if there is a new controller to access, it is necessary to replace the original slave controller 162 and re-pair the new controller with the unmanned aerial vehicle. If the master controller 162 is replaced, it needs to be re-accessed by scanning a code to connect to WiFi.

The first mobile terminal 164 in the embodiment of the present application is physically connected to the master controller 162 or is connected based on wireless communication, wherein the first mobile terminal 164 may include but is not limited to a mobile phone, a tablet computer, a controller, or an image device for displaying views.

The second mobile terminal 165 in the embodiment of the present application is physically connected to the master controller 163 or is connected based on wireless communication, wherein the second mobile terminal 165 may include but is not limited to a mobile phone, a tablet computer, a controller, or an image device for displaying views.

The content of the unmanned aerial vehicle 161 of the pairing system 160 of the unmanned aerial vehicle in the embodiment of the present application can be referred to the unmanned aerial vehicle mentioned in the above-mentioned embodiment and will not be described in detail.

The master controller 162 of the pairing system 160 of the unmanned aerial vehicle in the embodiment of the present application can be referred to the master controller mentioned in the above-mentioned embodiment and will not be described in detail.

The slave controller 163 of the pairing system 160 of the unmanned aerial vehicle in the embodiment of the present application can be referred to in reference to the slave controllers mentioned in the above-mentioned embodiment and will not be described in detail.

The first mobile terminal 164 of the pairing system 160 of the unmanned aerial vehicle in the embodiment of the present application can be referred to the first mobile terminal mentioned in the above-mentioned embodiment and will not be described in detail.

The second mobile terminal 165 of the pairing system 160 of the unmanned aerial vehicle in the embodiment of the present application can be referred to the second mobile terminal mentioned in the above-mentioned embodiment and will not be described in detail.

In an embodiment of the present application, by acquiring the pairing information transmitted by the master controller, the master controller is paired first, and then the slave controller is paired using the temporary pairing information, the present application can solve the problem of easy mis-pairing when a plurality of sets of unmanned aerial vehicles are paired at the same time, and improve the reliability and stability in the process of unmanned aerial vehicles pairing.

Further, an embodiment of the present application also provides a non-transitory computer-readable storage medium storing computer-executable instructions that, when executed by one or more processors, cause the one or more processors to perform a pairing method for an unmanned aerial vehicle in any of the method embodiments described above.

Further, an embodiment of the present application also provides a computer program product, wherein the computer program product includes a non-transitory computer-readable storage medium of a computer program operable to cause a computer to perform some or all the steps described in the pairing method for an unmanned aerial vehicle in any of the method embodiments described above. The computer program product may be a software installation package.

A pairing method for an unmanned aerial vehicle provided by an embodiment of the present application includes: acquiring pairing information transmitted by a master controller after the unmanned aerial vehicle is communicatively coupled to the master controller; establishing a master pairing relationship between a master controller and an unmanned aerial vehicle via pairing information transmitted by the master controller; receiving a slave pairing request forwarded by the master controller, generating temporary pairing information, and transmitting the temporary pairing information to the master controller; acquiring the temporary pairing information transmitted by the slave controller after the master controller transmits the temporary pairing information to the slave controller, wherein the temporary pairing information transmitted by the slave controller is obtained by the slave controller combining the key information about the unmanned aerial vehicle and the key information about the slave controller; and establishing a slave pairing relationship between the slave controller and the unmanned aerial vehicle according to the temporary pairing information transmitted by the slave controller.

By acquiring the pairing information transmitted by the master controller, the master controller is paired first, and then the slave controller is paired using the temporary pairing information, the present application can solve the problem of easy mis-pairing when a plurality of sets of unmanned aerial vehicles are paired at the same time, and improve the reliability and stability in the process of unmanned aerial vehicles pairing.

The embodiments of the apparatus described above are merely schematic, wherein the elements illustrated as separate components may or may not be physically separated, and the elements shown as elements may or may not be physical elements, i.e. may be located in one place, or may also be distributed over a plurality of network elements. Some or all the modules may be selected according to actual needs to achieve the purpose of the solution of this embodiment. Some or all the modules are selected according to actual needs to achieve the purpose of the solution of this embodiment.

From the above description of the embodiments, it will be clear to a person skilled in the art that the embodiments can be implemented by means of software plus a general-purpose hardware platform, but also by means of hardware. It will be appreciated by a person skilled in the art that implementing all or part of the flow of the methods of the embodiments described above can be accomplished by a computer program in a computer program product instructing the associated hardware, the computer program can be stored on a non-transitory computer-readable storage medium, and the computer program can include program instructions that, when executed by the associated device, cause the associated device to perform the flow of the embodiments of the methods described above. The storage medium may be a magnetic disk, an optical disk, a Read-Only Memory (ROM) or a Random Access Memory (RAM), and the like The above-mentioned product can execute the pairing method for an unmanned aerial vehicle provided by the above-mentioned embodiment of the present application, and has corresponding functional modules and beneficial effects for executing the pairing method for an unmanned aerial vehicle. For technical details not described in detail in an embodiment of the present application, reference can be made to the pairing method for an unmanned aerial vehicle provided in the above-mentioned embodiment of the present application.

Finally, it should be noted that: the above-mentioned embodiments are merely illustrative of the technical solution of the present application, and do not limit same; the technical features in the above embodiments or in different embodiments may also be combined under the idea of the present application, the steps may be implemented in any order, and there are many other variations of the different aspects of the present application as above, which are not provided in the details for the sake of brevity; although the present application has been described in detail Referring to the foregoing embodiments, a person skilled in the art will appreciate that: the technical solutions disclosed in the above-mentioned embodiments can still be amended, or some of the technical features thereof can be replaced by equivalents; however, these modifications or substitutions do not bring the essence of the corresponding technical solutions out of the scope of the technical solutions of the various an embodiment of the present application.

What is claimed is:

1. A pairing method for an unmanned aerial vehicle, wherein the method is applied to the unmanned aerial vehicle, and the method comprises:
   acquiring pairing information transmitted by a master controller after the unmanned aerial vehicle is communicatively coupled to the master controller;
   establishing a master pairing relationship between the master controller and the unmanned aerial vehicle according to the pairing information transmitted by the master controller;
   receiving a slave pairing request forwarded by the master controller, generating temporary pairing information, and transmitting the temporary pairing information to the master controller, wherein the slave pairing request is transmitted by a slave controller to the master controller;
   acquiring the temporary pairing information transmitted by the slave controller after the master controller transmits the temporary pairing information to the slave controller, wherein the temporary pairing information transmitted by the slave controller is obtained by the slave controller combining key information about the unmanned aerial vehicle and key information about the slave controller; and
   establishing a slave pairing relationship between the slave controller and the unmanned aerial vehicle according to the temporary pairing information transmitted by the slave controller.

2. The pairing method according to claim 1, wherein the master controller corresponds to a first application is configured to acquire the pairing information of the master controller and transmit the pairing information of the master controller to the unmanned aerial vehicle, and the acquire the pairing information transmitted by the master controller comprises:
   receiving the pairing information transmitted by the first application after the first application receives the pairing information transmitted by the master controller, wherein the first application is communicatively coupled with the unmanned aerial vehicle by scanning a two-dimensional code corresponding to the unmanned aerial vehicle.

3. The pairing method according to claim 1, wherein the establishing a master pairing relationship between the master controller and the unmanned aerial vehicle according to the pairing information transmitted by the master controller comprises:
controlling the unmanned aerial vehicle to enter a first search and decoding state after receiving the pairing information transmitted by the first application, wherein the first search and decoding state is configured to acquire the pairing information of the master controller and transmit the pairing information about the unmanned aerial vehicle to the first application; and
establish a master pairing relationship between the master controller and the unmanned aerial vehicle after the unmanned aerial vehicle acquires the pairing information about the master controller and the master controller acquires the pairing information about the unmanned aerial vehicle, wherein the pairing information about the master controller comprises the key information about the master controller and the pairing information about the unmanned aerial vehicle comprises the key information about the unmanned aerial vehicle.

4. The pairing method according to claim 1, wherein the slave controller corresponds to a second application for acquiring the pairing information of the slave controller and transmitting the pairing information of the slave controller to the unmanned aerial vehicle, and the acquiring the temporary pairing information transmitted by the slave controller after the master controller transmits the temporary pairing information to the slave controller comprises:
acquiring the temporary pairing information transmitted by the second application corresponding to the slave controller after the first application corresponding to the master controller transmits the temporary pairing information to the second application corresponding to the slave controller.

5. The pairing method according to claim 1, wherein the receiving a slave pairing request forwarded by the master controller and generating the temporary pairing information comprises:
combining the key information about the unmanned aerial vehicle, the key information about the master controller, and a temporary code to generate the temporary pairing information after receiving the slave pairing request forwarded by the master controller.

6. The pairing method according to claim 1, wherein the establishing a slave pairing relationship between the slave controller and the unmanned aerial vehicle according to the temporary pairing information transmitted by the slave controller comprises:
controlling the unmanned aerial vehicle to enter a second search and decoding state after receiving the temporary pairing information transmitted by the second application, wherein the second search and decoding state is configured to acquire the pairing information about the slave controller and transmit the pairing information about the unmanned aerial vehicle to the second application;
establish a slave pairing relationship between the slave controller and the unmanned aerial vehicle after the unmanned aerial vehicle acquires the pairing information of the slave controller and the slave controller acquires the pairing information of the unmanned aerial vehicle, wherein the pairing information of the slave controller comprises the key information about the slave controller and the pairing information of the unmanned aerial vehicle comprises the key information of the unmanned aerial vehicle.

7. The pairing method according to claim 1, wherein after establishing the slave pairing relationship of the slave controller with the unmanned aerial vehicle, the method further comprises:
generating temporary pairing information again, and transmitting the temporary pairing information to the master controller if the slave pairing request transmitted by the master controller is received again, wherein the slave pairing request is transmitted by another slave controller;
acquiring temporary pairing information transmitted by another slave controller after the master controller transmits the temporary pairing information to another slave controller, wherein the temporary pairing information transmitted by the another slave controller is obtained by another slave controller combining the key information about the unmanned aerial vehicle and the key information about the another slave controller;
establishing a slave pairing relationship between the another slave controller and the unmanned aerial vehicle according to the temporary pairing information transmitted by the another slave controller; and
dissolving the slave pairing relationship of the previous slave controller with the unmanned aerial vehicle after the slave pairing relationship of another slave controller with the unmanned aerial vehicle is successfully established.

8. The pairing method according to claim 1, wherein
the master controller corresponds to a master control power, and the master control power corresponds to a first authority of the unmanned aerial vehicle; the slave controller corresponds to a slave control power, and the slave control power corresponds to a second authority of the unmanned aerial vehicle; wherein the first authority comprises a flight control authority, a pan-tilt control authority and a viewing authority, and the second authority comprises the viewing authority.

9. A pairing system of an unmanned aerial vehicle, and the system comprises:
an unmanned aerial vehicle;
a master controller communicatively coupled to the unmanned aerial vehicle; and
a slave controller communicatively coupled to the unmanned aerial vehicle;
acquiring, by the unmanned aerial vehicle, pairing information transmitted by the master controller after the unmanned aerial vehicle is communicatively coupled to the master controller;
establishing, by the unmanned aerial vehicle, a master pairing relationship between the master controller and the unmanned aerial vehicle according to the pairing information transmitted by the master controller;
receiving, by the master controller, a slave pairing request transmitted by the slave controller and forwarding the slave pairing request to the unmanned aerial vehicle;
generating, by the master controller, temporary pairing information after the unmanned aerial vehicle receives the slave pairing request forwarded, and transmitting the temporary pairing information to the master controller; and
acquiring, by the unmanned aerial vehicle, the temporary pairing information transmitted by the slave controller, wherein the temporary pairing information transmitted by the slave controller is obtained by the slave controller combining the key information about the unmanned aerial vehicle and the key information about the slave controller, and establishing a slave pairing relationship between the slave controller and the unmanned aerial vehicle according to the temporary pairing information transmitted by the slave controller.

10. The pairing system according to claim 9, wherein the master controller corresponds to a first application is configured to acquire the pairing information of the master controller and transmit the pairing information of the master controller to the unmanned aerial vehicle, and the acquire the pairing information transmitted by the master controller comprises:
 receiving the pairing information transmitted by the first application after the first application receives the pairing information transmitted by the master controller, wherein the first application is communicatively coupled with the unmanned aerial vehicle by scanning a two-dimensional code corresponding to the unmanned aerial vehicle.

11. The pairing system according to claim 9, wherein the establishing a master pairing relationship between the master controller and the unmanned aerial vehicle according to the pairing information transmitted by the master controller comprises:
 controlling the unmanned aerial vehicle to enter a first search and decoding state after receiving the pairing information transmitted by the first application, wherein the first search and decoding state is configured to acquire the pairing information of the master controller and transmit the pairing information about the unmanned aerial vehicle to the first application; and
 establish a master pairing relationship between the master controller and the unmanned aerial vehicle after the unmanned aerial vehicle acquires the pairing information about the master controller and the master controller acquires the pairing information about the unmanned aerial vehicle, wherein the pairing information about the master controller comprises the key information about the master controller and the pairing information about the unmanned aerial vehicle comprises the key information about the unmanned aerial vehicle.

12. The pairing system according to claim 9, wherein the slave controller corresponds to a second application for acquiring the pairing information of the slave controller and transmitting the pairing information of the slave controller to the unmanned aerial vehicle, and the acquiring the temporary pairing information transmitted by the slave controller after the master controller transmits the temporary pairing information to the slave controller comprises:
 acquiring the temporary pairing information transmitted by the second application corresponding to the slave controller after the first application corresponding to the master controller transmits the temporary pairing information to the second application corresponding to the slave controller.

13. The pairing system according to claim 9, wherein the receiving a slave pairing request forwarded by the master controller and generating the temporary pairing information comprises:
 combining the key information about the unmanned aerial vehicle, the key information about the master controller, and a temporary code to generate the temporary pairing information after receiving the slave pairing request forwarded by the master controller.

14. The pairing system according to claim 9, wherein the establishing a slave pairing relationship between the slave controller and the unmanned aerial vehicle according to the temporary pairing information transmitted by the slave controller comprises:
 controlling the unmanned aerial vehicle to enter a second search and decoding state after receiving the temporary pairing information transmitted by the second application, wherein the second search and decoding state is configured to acquire the pairing information about the slave controller and transmit the pairing information about the unmanned aerial vehicle to the second application;
 establish a slave pairing relationship between the slave controller and the unmanned aerial vehicle after the unmanned aerial vehicle acquires the pairing information of the slave controller and the slave controller acquires the pairing information of the unmanned aerial vehicle, wherein the pairing information of the slave controller comprises the key information about the slave controller and the pairing information of the unmanned aerial vehicle comprises the key information of the unmanned aerial vehicle.

15. The pairing system according to claim 9, wherein after establishing the slave pairing relationship of the slave controller with the unmanned aerial vehicle, the method further comprises:
 generating temporary pairing information again, and transmitting the temporary pairing information to the master controller if the slave pairing request transmitted by the master controller is received again, wherein the slave pairing request is transmitted by another slave controller;
 acquiring temporary pairing information transmitted by another slave controller after the master controller transmits the temporary pairing information to another slave controller, wherein the temporary pairing information transmitted by the another slave controller is obtained by another slave controller combining the key information about the unmanned aerial vehicle and the key information about the another slave controller;
 establishing a slave pairing relationship between the another slave controller and the unmanned aerial vehicle according to the temporary pairing information transmitted by the another slave controller; and
 dissolving the slave pairing relationship of the previous slave controller with the unmanned aerial vehicle after the slave pairing relationship of another slave controller with the unmanned aerial vehicle is successfully established.

16. The pairing system according to claim 9, wherein
 the master controller corresponds to a master control power, and the master control power corresponds to a first authority of the unmanned aerial vehicle; the slave controller corresponds to a slave control power, and the slave control power corresponds to a second authority of the unmanned aerial vehicle; wherein the first authority comprises a flight control authority, a pan-tilt control authority and a viewing authority, and the second authority comprises the viewing authority.

17. An unmanned aerial vehicle, comprising:
 at least one processor; and
 a memory communicatively coupled to the at least one processor; wherein the memory stores instructions executable by the at least one processor to enable the at least one processor to perform the pairing method for an unmanned aerial vehicle, wherein the method comprises:

acquiring pairing information transmitted by a master controller after the unmanned aerial vehicle is communicatively coupled to the master controller;

establishing a master pairing relationship between the master controller and the unmanned aerial vehicle according to the pairing information transmitted by the master controller;

receiving a slave pairing request forwarded by the master controller, generating temporary pairing information, and transmitting the temporary pairing information to the master controller, wherein the slave pairing request is transmitted by a slave controller to the master controller;

acquiring the temporary pairing information transmitted by the slave controller after the master controller transmits the temporary pairing information to the slave controller, wherein the temporary pairing information transmitted by the slave controller is obtained by the slave controller combining key information about the unmanned aerial vehicle and key information about the slave controller; and establishing a slave pairing relationship between the slave controller and the unmanned aerial vehicle according to the temporary pairing information transmitted by the slave controller.

18. The unmanned aerial vehicle according to claim 17, wherein the master controller corresponds to a first application is configured to acquire the pairing information of the master controller and transmit the pairing information of the master controller to the unmanned aerial vehicle, and the acquire the pairing information transmitted by the master controller comprises:

receiving the pairing information transmitted by the first application after the first application receives the pairing information transmitted by the master controller, wherein the first application is communicatively coupled with the unmanned aerial vehicle by scanning a two-dimensional code corresponding to the unmanned aerial vehicle.

19. The unmanned aerial vehicle according to claim 17, wherein the establishing a master pairing relationship between the master controller and the unmanned aerial vehicle according to the pairing information transmitted by the master controller comprises:

controlling the unmanned aerial vehicle to enter a first search and decoding state after receiving the pairing information transmitted by the first application, wherein the first search and decoding state is configured to acquire the pairing information of the master controller and transmit the pairing information about the unmanned aerial vehicle to the first application; and establish a master pairing relationship between the master controller and the unmanned aerial vehicle after the unmanned aerial vehicle acquires the pairing information about the master controller and the master controller acquires the pairing information about the unmanned aerial vehicle, wherein the pairing information about the master controller comprises the key information about the master controller and the pairing information about the unmanned aerial vehicle comprises the key information about the unmanned aerial vehicle.

20. The unmanned aerial vehicle according to claim 17, wherein the slave controller corresponds to a second application for acquiring the pairing information of the slave controller and transmitting the pairing information of the slave controller to the unmanned aerial vehicle, and the acquiring the temporary pairing information transmitted by the slave controller after the master controller transmits the temporary pairing information to the slave controller comprises:

acquiring the temporary pairing information transmitted by the second application corresponding to the slave controller after the first application corresponding to the master controller transmits the temporary pairing information to the second application corresponding to the slave controller.

\* \* \* \* \*